(12) United States Patent
Goto et al.

(10) Patent No.: US 10,582,717 B2
(45) Date of Patent: Mar. 10, 2020

(54) STORAGE DEVICE

(71) Applicants: Kanetaka Goto, Tokyo (JP); Takayuki Kato, Joetsu (JP); Kanako Kondo, Tokyo (JP)

(72) Inventors: Kanetaka Goto, Tokyo (JP); Takayuki Kato, Joetsu (JP); Kanako Kondo, Tokyo (JP)

(73) Assignee: Kanetaka Goto, Tokyo (JP)

( * ) Notice: Subject to any disclaimer, the term of this patent is extended or adjusted under 35 U.S.C. 154(b) by 352 days.

(21) Appl. No.: 15/646,093

(22) Filed: Jul. 11, 2017

(65) Prior Publication Data

US 2017/0311636 A1 Nov. 2, 2017

Related U.S. Application Data

(60) Division of application No. 15/597,161, filed on May 17, 2017, which is a division of application No.
(Continued)

(30) Foreign Application Priority Data

Feb. 17, 2014 (JP) ................................. 2014-027804

(51) Int. Cl.
*A23L 3/32* (2006.01)
*A47J 37/12* (2006.01)
(Continued)

(52) U.S. Cl.
CPC .................. *A23L 3/32* (2013.01); *A47J 37/12* (2013.01); *F25D 11/00* (2013.01); *F25D 13/00* (2013.01);
(Continued)

(58) Field of Classification Search
CPC ..... A61K 9/2866; A23L 3/32; A23V 2002/00; A47J 37/12; F25D 11/00; F25D 13/00;
(Continued)

(56) References Cited

U.S. PATENT DOCUMENTS 5,393,541 A * 2/1995 Bushnell .................. A23L 3/32
426/234
6,138,555 A * 10/2000 Hata ...................... A23L 3/005
363/52
(Continued)

FOREIGN PATENT DOCUMENTS

JP 2002-333265 A 11/2002
JP 2006-100031 A 4/2006
(Continued)

OTHER PUBLICATIONS

International Search Report for PCT/JP2014/080512 dated Feb. 17, 2015.
(Continued)

*Primary Examiner* — Dana Ross
*Assistant Examiner* — Joseph W Iskra
(74) *Attorney, Agent, or Firm* — Yokoi & Co., U.S.A.; Toshiyuki Yokoi

(57) ABSTRACT

A storage device includes a potential generator; and a compartment for determining a storage space formed around a discharging electrode of the potential generator. The potential generator includes a transformer that is composed of a primary coil and a secondary coil; a feedback control circuit that feeds back one terminal of the secondary coil to one terminal of the primary coil to adjust a voltage of the secondary coil; an output control portion that is provided on the other terminal of the secondary coil to impart a predetermined low frequency vibration to an output of the secondary coil which causes the discharging electrode physi-
(Continued)

cally vibrates; and the discharging electrode that is formed of a conductive material and provided on the other terminal of the secondary coil via the output control portion. A vibration frequency of the low frequency vibration applied is 40 Hz to 60 Hz which is determined by the output control portion.

5 Claims, 14 Drawing Sheets

Related U.S. Application Data

14/743,934, filed on Jun. 18, 2015, now Pat. No. 9,681,677, which is a continuation of application No. PCT/JP2014/080512, filed on Nov. 18, 2014.

(51) Int. Cl.
| | |
|---|---|
| *H01F 27/42* | (2006.01) |
| *F25D 11/00* | (2006.01) |
| *F25D 13/00* | (2006.01) |
| *H01F 27/29* | (2006.01) |
| *H01T 19/00* | (2006.01) |
| *H01T 23/00* | (2006.01) |
| *F25D 23/12* | (2006.01) |

(52) U.S. Cl.
CPC .............. *H01F 27/29* (2013.01); *H01F 27/42* (2013.01); *A23V 2002/00* (2013.01); *F25D 23/12* (2013.01); *H01T 19/00* (2013.01); *H01T 23/00* (2013.01)

(58) Field of Classification Search
CPC .......... F25D 23/12; H01F 27/29; H01F 27/42; H01T 19/00; H01T 23/00
USPC ........................................................... 99/451
See application file for complete search history.

(56) References Cited

U.S. PATENT DOCUMENTS

| | | | | |
|---|---|---|---|---|
| 6,803,065 | B1* | 10/2004 | Miyamori | .............. A23B 4/056 |
| | | | | 426/235 |
| 2011/0290123 | A1* | 12/2011 | Ichinose | ................... A23L 3/32 |
| | | | | 99/451 |

FOREIGN PATENT DOCUMENTS

| | | | |
|---|---|---|---|
| JP | 2008-059886 A | | 3/2008 |
| JP | 2008059886 | * | 3/2008 |
| JP | 2009-059590 A | | 3/2009 |
| JP | 4445594 B | | 1/2010 |
| JP | 2012-207900 A | | 10/2012 |
| JP | 2013-120670 A | | 6/2013 |
| WO | 2006/054348 A | | 5/2006 |

OTHER PUBLICATIONS

PCT written opinion dated Feb. 17, 2015.
Japanese notice of the reason for refusal dated Sep. 18, 2014.

* cited by examiner

| spatial voltage | applied voltage | kind of food | with space potential generator | without space potential generator |
|---|---|---|---|---|
| 1 V | 10 V | 2 tons of beef<br>1 ton of pork<br>1 ton of chicken | dripping was reduced by 95% | dripping was seen all over the floor | temperature in chamber: 5°C
humidity in chamber: 65%
inner dimension of chamber: 6 m × 6 m × 3 m

Fig. 4

| | initial state | | comparison after 10 days | | cut state | | S.P.G.: space potential generator comparison result |
|---|---|---|---|---|---|---|---|
| | with S.P.G. | without S.P.G. | with S.P.G. | without S.P.G. | with S.P.G. | without S.P.G. | |
| ① green pepper | | | | | | | with S.P.G. -moisture was kept inside although a little shriveled -could be eaten even after 10 days / without S.P.G. -shriveled a lot -completely dried -disposed after 5 days |
| ② carrot | | | | | | | with S.P.G. -moisture inside was kept and color inside was not changed although color of skin was changed -could be eaten even after 10 days / without S.P.G. -color inside was also changed -disposed after 5 days |
| ③ broccoli | | | | | | | with S.P.G. -color was changed to yellow -could be eaten even after 8 days / without S.P.G. -color of clusters was changed to black -disposed after 4 days |
| ④ Chinese cabbage | | | | | | | with S.P.G. -moisture was kept and leafs were kept crispy -could be eaten even after 10 days / without S.P.G. -dried and leafs were completely open -disposed after 5 days |

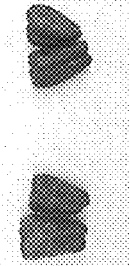
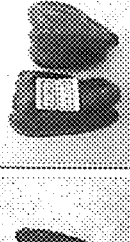
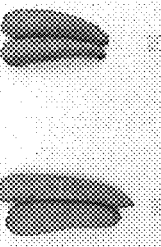
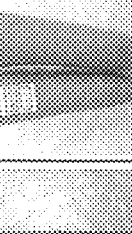

Fig. 5

| | initial state | | comparison after 10 days | | cut state | | comparison result |
|---|---|---|---|---|---|---|---|
| | with S.P.G. | without S.P.G. | with S.P.G. | without S.P.G. | with S.P.G. | without S.P.G. | S.P.G.: space potential generator |
| ⑧ cabbage |  | 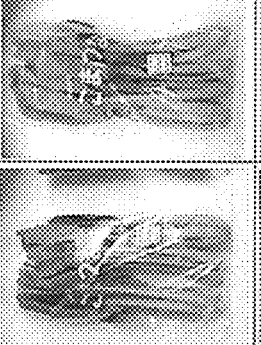 | 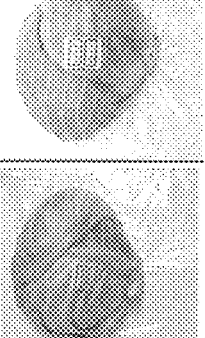 | 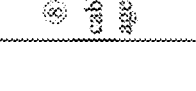 | 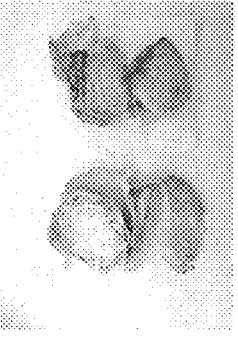 | 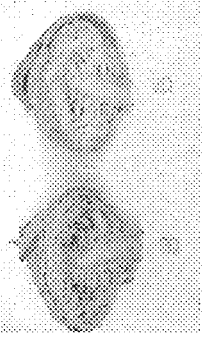 | with S.P.G. -core was kept white -could be eaten even after 8 days  without S.P.G. -core became black -disposed after 4 days |
| ⑨ komatsuna | 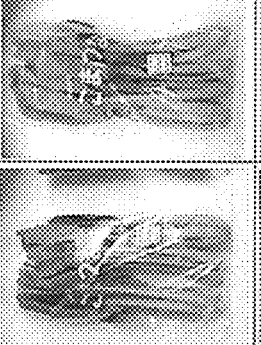 | 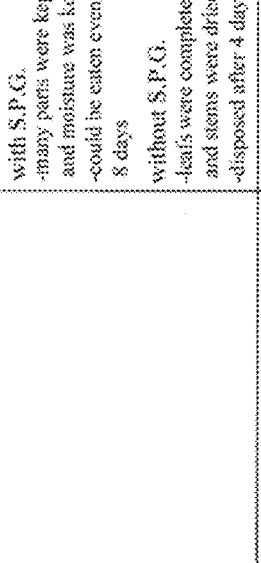 | 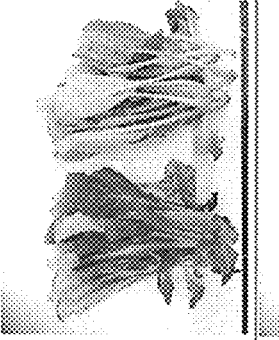 | 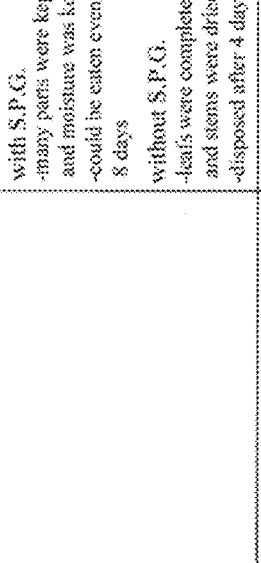 | | | with S.P.G. -many parts were kept green and moisture was kept -could be eaten even after 8 days  without S.P.G. -leafs were completely dried and stems were dried -disposed after 4 days |
| ⑩ spinach |  | 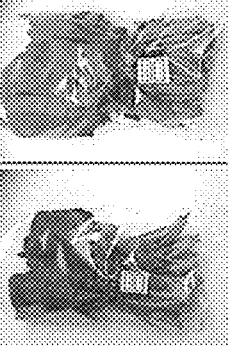 | 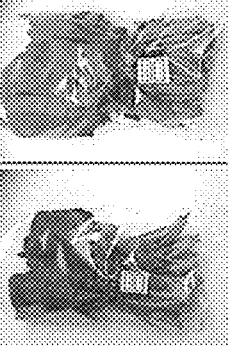 | 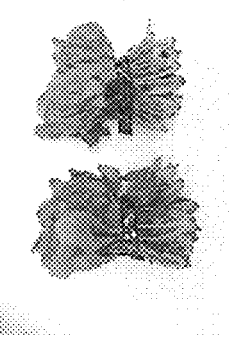 | | | with S.P.G. -many parts were kept green and moisture was kept -could be eaten even after 10 days  without S.P.G. -leafs were completely dried and stems were dried -disposed after 3 days |
| ⑪ scallion | 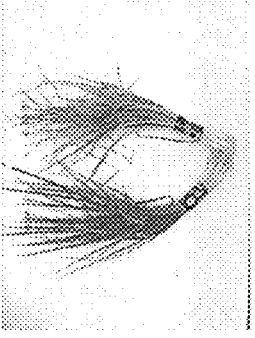 | 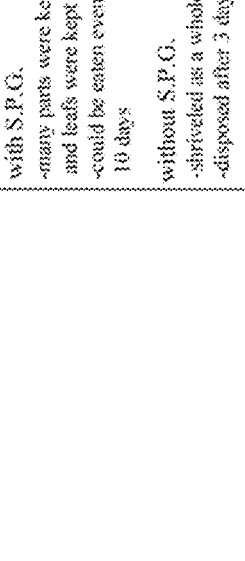 |  | 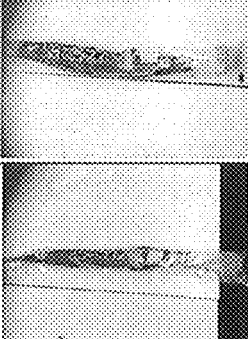 | | | with S.P.G. -many parts were kept green and leafs were kept fresh -could be eaten even after 10 days  without S.P.G. -shriveled as a whole -disposed after 3 days |

Fig. 6

| | initial state | | comparison after 10 days | | cut state | | S.P.G.: space potential generator |
|---|---|---|---|---|---|---|---|
| | with S.P.G. | without S.P.G. | with S.P.G. | without S.P.G. | with S.P.G. | without S.P.G. | comparison result |
| celery | | | | | | | with S.P.G.<br>-freshness was kept<br>-could be eaten even after 6 days<br>without S.P.G.<br>-completely dried<br>-disposed after 3 days |
| green onion | | | | | | | with S.P.G.<br>-many parts were kept green and moisture was kept<br>-could be eaten even after 10 days<br>without S.P.G.<br>-completely dried and stems were dried<br>-disposed after 4 days |
| lettuce | | | | | | | with S.P.G.<br>-moisture was kept<br>-could be eaten even after 10 days<br>without S.P.G.<br>-completely dried and spoilage began<br>-disposed after 4 days |
| lettuce | | | | | | | with S.P.G.<br>-moisture was kept and inside was kept fresh<br>-could be eaten even after 12 days<br>without S.P.G.<br>-moisture was less although an outer appearance wasn't changed<br>-disposed after 6 days | without space potential generator with space potential generator

Fig. 15A
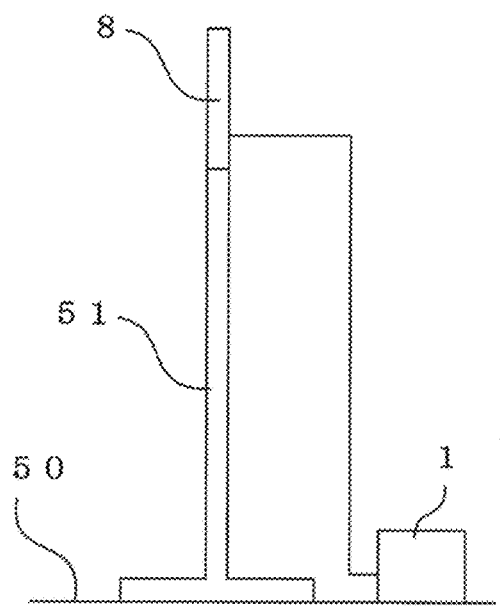
Fig. 15B
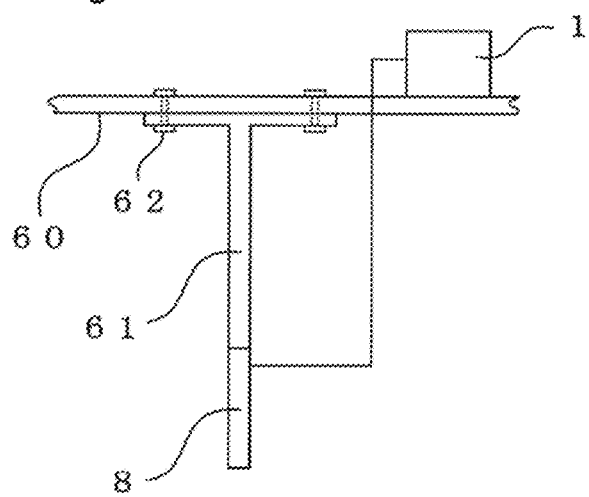
Fig. 16
food: mango
|  | temperature for freezing | texture after thawed | inside state after thawed |
|---|---|---|---|
| quick freezer | -60 °C | normal | moisture was lost |
| normal refrigerator + space potential generator | -18 °C | good | moisture was kept |

| test items | color difference | value L | value aL | value bL |
|---|---|---|---|---|
| oil before cooking | — | 99.44 | −5.33 | 13.62 |
| fryer provided with space potential generator | 6.43 | 54.75 | 6.85 | 33.62 |
| fryer not provided with space potential generator | | 53.44 | 13.07 | 34.57 |

# STORAGE DEVICE

CROSS-REFERENCES TO RELATED APPLICATIONS

This Application is a divisional application claiming the benefit of priority of the co-pending U.S. Utility Non-Provisional patent application Ser. No. 14/743,934 with a filing date of Jun. 18, 2015, which claims the benefit of priority of International Patent Application No. PCT/JP2014/080512, with an international filing date of Nov. 18, 2014, which designated the United States, and is related to the Japanese Patent Application No. 2014-027804, filed Feb. 17, 2014, the entire disclosures of all applications are expressly incorporated by reference in their entirety herein.

BACKGROUND OF THE INVENTION

1. Field of the Invention

The present invention relates to a space potential generator that discharges a static electricity to a space to form an electric field, a freshness-keeping device to keep freshness of food or the like using the space potential generator, and a fryer provided with the space potential generator.

2. Description of Related Art

Conventionally, preserving food in an electric field is proposed to suppress bacteria growth and prevent deterioration of the food (Patent documents 1 to 3).

The invention described in the patent document 1 aims for performing an electric field processing evenly to objects. An inner electrode and an outer electrode, which is arranged around the inner electrode, are provided. An electric field processing area is formed between the inner electrode and the outer electrode. By applying an AC voltage having the same polarity to each of the electrodes, a positive electric field and a negative electric field are alternately generated on the electric field processing area.

In the invention described in the patent document 2, a conductive electrode is provided in a refrigerator as a shelf board, and the conductive electrode is connected to a high voltage generator provided outside the refrigerator. Thus, an electrostatic field is generated around the conductive electrode, which is provided as the shelf board.

In the invention described in the patent document 3, a pair of electrodes is provided in a storage compartment, and an electric field is formed in the storage compartment by applying a voltage to the pair of electrodes.

[Patent Document 1] International Publication No. WO2006/054348

[Patent Document 2] Japanese patent No. 4445594

[Patent Document 3] Japanese Unexamined Patent Application Publication No. 2012-207900.

In the inventions described in the patent documents 1 to 3, the electric field is formed and food is preserved in the electric field. Thus, bacteria growth is suppressed and deterioration of the food is prevented.

However, in the inventions described in the patent documents 1 to 3, the electric field is formed between the electrodes and the food is preserved in the electric field formed between the electrodes. Therefore, two or more outputs are necessarily required and a structure becomes complicated. Furthermore, a size of the space to store the food is limited because a distance between the electrodes is limited.

In the invention described in the patent document 2, judging from its circuit configuration, the electric field can be formed only immediately near the conductive electrode, which is provided as the shelf board. Therefore, unless the food is in contact with the shelf board, an effect of the electric field cannot be obtained.

In particular, in the inventions described in the patent documents 2 and 3, judging from their configurations, the effect can be obtained only when an electrode shelf board is provided entirely in the refrigerator. Therefore, the shelf board having a dimension corresponding to the size of the refrigerator should be preliminarily produced and the produced shelf board should be installed on the refrigerator by a welding work or the like. When post-installing the space potential generator in a refrigerating compartment or the like, cost and time are needed and a large amount of facility investment is required. In addition, since the electrode shelf board should be installed in the refrigerator, a capacity of the refrigerator is reduced by the electrode shelf board.

Also in the invention described in the patent document 1, the electric field is formed only at a space between two or more electrodes. Therefore, a plurality of electrodes having a dimension corresponding to the size of the refrigerator should be preliminarily produced and the produced electrodes should be installed to cover whole the refrigerator. Thus, a location to install the electrodes is limited. It is difficult to post-install the electrodes in an existing refrigerator or the like.

In the invention described in the patent documents 1 to 3, current intensity is high. Therefore, an electromagnetic shield should be installed in entire the refrigerator.

Furthermore, in a case of a large-size prefabricated refrigerator or a large-scale storehouse, a voltage of 5000 to 10000 V is required to supply electricity to a large-sized electrode shelf board or electrodes. Thus, electricity bill is expensive. In addition, the food to be preserved is directly placed on the electrode shelf board to which the voltage of 5000 to 10000 V is applied. Therefore, electricity may be charged on a human body when a worker touches the food.

Furthermore, in the invention described in the patent documents 1 to 3, the electrode shelf board should be installed or a plurality of electrodes should be installed at a predetermined interval. Therefore, when installing them, the food in the refrigerator should be temporarily moved to another place.

Furthermore, in the invention described in the patent documents 1 to 3, an extremely large transformer having a large number of turns is required to obtain a necessary output voltage. Therefore, the device as a whole becomes large.

The present invention can solve the above described conventional problems. The present invention provides a space potential generator and a freshness-keeping device using the space potential generator enabling to downsize the device as a whole, keep a capacity of the refrigerator same as before the space potential generator is installed, and generate an electric field in a wide range.

In addition, the present invention provides a fryer that efficiently forms an electric field in an oil tub to prevent deterioration of oil and generation of acrylamide, shorten time required for frying, and reduce fat and oil smoke.

BRIEF SUMMARY OF THE INVENTION

A space potential generator concerning an embodiment of the present invention comprises: a transformer that is formed by magnetically connecting a primary coil and a secondary coil; a feedback control circuit that feeds back one terminal of the secondary coil to one terminal of the primary coil to adjust a voltage of the secondary coil; an output control portion that is provided on the other terminal of the secondary coil to impart a low frequency vibration to an output of the secondary coil; and a static electricity discharger that is formed of a conductive material and provided on the other terminal of the secondary coil via the output control portion, wherein the space potential generator does not have a grounding electrode, a current flowing through the secondary coil is a weak current having a range of 0.002 to 0.2 A, the static electricity discharger is covered with an insulating member having a predetermined insulating property suitable for allowing the static electricity discharger to discharge a static electricity of a predetermined voltage to a surrounding space, and an electric field of a target voltage is formed in the surrounding space by the static electricity discharged from the static electricity discharger.

A frequency of the low frequency vibration imparted to the static electricity discharger can be preferably within a range of 40 to 60 Hz.

A voltage value of the static electricity discharged from the static electricity discharger via the insulating member can be specified according to a size of the space in which the electric field is formed so as to form the electric field capable of applying a voltage of at least 5 V to the object existed in the surrounding space of the static electricity discharger. Therefore, in addition to the voltage value inputted, values of the transformer, the feedback control circuit and the output control portion, and a material and a size of the insulating material can be determined so that the voltage value of the static electricity discharged from the static electricity discharger via the insulating member becomes the specified value.

The material used as the insulating member is not limited. For example, a rubber, a polyethylene (PE), an acrylic, a polycarbonate, a cardboard, a polyethylene terephthalate (PET), and a wood can be used.

Although the static electricity discharger can be completely covered with the insulating member, the insulating member can be formed by a plate material having small holes, for example. In this case, a shape of the holes is not particularly limited.

The static electricity discharger can be preferably formed by a conductive plate, and the static electricity can be discharged from a plate surface of the conductive plate. In this case, a plurality of openings can be preferably formed on the conductive plate.

In the space potential generator of the present invention, since the static electricity discharger is covered with the insulating material, corona discharge is not generated from the static electricity discharger. Therefore, the static electricity discharger is not necessarily a plate-shape as long as it is conductive. For example, the static electricity discharger can be a bar-shape or a liner-shape.

If the static electricity discharger is a plate-shape, the insulating member can be formed to sandwich the plate-shape static electricity discharger from above and below, for example. If the static electricity discharger is a bar-shape of a liner-shape, the insulating member can be formed as a cylindrical body, for example.

As apparent from the above explanation, a space potential generator concerning another embodiment of the present invention comprises: a transformer that is formed by magnetically connecting a primary coil and a secondary coil; a feedback control circuit that feeds back one terminal of the secondary coil to one terminal of the primary coil to adjust a voltage of the secondary coil; an output control portion that is provided on the other terminal of the secondary coil to impart a low frequency vibration to an output of the secondary coil; and a plate-like static electricity discharger that is formed of a conductive material and provided on the other terminal of the secondary coil via the output control portion, wherein the space potential generator does not have a grounding electrode, a static electricity is discharged from a plate surface of the plate-like static electricity discharger provided on the other terminal of the secondary coil to a space.

In this case, the low frequency vibration can be preferably within a range of 40 to 60 Hz.

As explained later, the freshness-keeping device can include a compartment for determining a freshness-keeping space formed around the static electricity discharger, and can include a fryer so that the static electricity discharger is installed in an oil tub of the fryer.

A freshness-keeping device concerning the present invention comprises: a space potential generator; and a compartment for determining a freshness-keeping space formed around the static electricity discharger of the space potential generator, wherein the space potential generator comprising: a transformer that is formed by magnetically connecting a primary coil and a secondary coil; a feedback control circuit that feeds back one terminal of the secondary coil to one terminal of the primary coil to adjust a voltage of the secondary coil; an output control portion that is provided on the other terminal of the secondary coil to impart a low frequency vibration to an output of the secondary coil; and a static electricity discharger that is formed of a conductive material and provided on the other terminal of the secondary coil via the output control portion, wherein the space potential generator does not have a grounding electrode, a current flowing through the secondary coil is a weak current having a range of 0.002 to 0.2 A, the static electricity discharger is covered with an insulating member having a predetermined insulating property suitable for allowing the static electricity discharger to discharge a static electricity of a predetermined voltage to a surrounding space, and an electric field of a predetermined voltage is formed in a surrounding space by the static electricity discharged from the static electricity discharger, and the electric field is formed in the freshness-keeping space by discharging the static electricity from the static electricity discharger of the space potential generator to keep a freshness of a food in the freshness-keeping space.

A voltage value of the static electricity discharged from the static electricity discharger via the insulating member can be specified according to a size of the freshness-keeping space so as to form the electric field capable of applying a voltage of at least 5 V to the object such as food existed in the freshness-keeping space. Therefore, in addition to the voltage value inputted, values of the transformer, the feedback control circuit and the output control portion, and a material and a size of the insulating material can be determined so that the voltage value of the static electricity discharged from the static electricity discharger via the insulating member becomes the specified value.

The static electricity discharger can be preferably formed by a conductive plate, and the static electricity can be discharged from a plate surface of the conductive plate. In this case, a plurality of openings can be preferably formed on the conductive plate.

In the space potential generator of the freshness-keeping device of the present invention, since the static electricity discharger is covered with the insulating material, corona discharge is not generated from the static electricity discharger. Therefore, the static electricity discharger is not necessarily a plate-shape as long as it is conductive. For example, the static electricity discharger can be a bar-shape or a liner-shape.

If the static electricity discharger is a plate-shape, the insulating member can be formed to sandwich the plate-shape static electricity discharger from above and below, for example. If the static electricity discharger is a bar-shape of a liner-shape, the insulating member can be formed as a cylindrical body, for example.

The compartment for determining the freshness-keeping space can be anything as long as it has an inside space capable of storing the food or the like. For example, the compartment for determining the freshness-keeping space can be a home-use refrigerator/freezer, a business-use large-size prefabricated refrigerator/freezer, a food storage and a store. The object stored in the freshness-keeping space for keeping freshness is not limited to the food. The object can be anything such as oil. In this case, the compartment for determining the freshness-keeping space is formed by the fryer.

The insulating member covering the static electricity discharger of the space potential generator can be an insulating member of exclusive use. Otherwise, a housing or a wall surface of the refrigerator and the freezer forming the compartment for determining the freshness-keeping space can be used as an insulating material, for example. Specifically, in a case of the refrigerator, for example, the static electricity discharger is embedded in a peripheral wall or an inside partition wall of the refrigerator.

A fryer provided with the space potential generator concerning the present invention comprises: a space potential generator; and a fryer having an oil tub, wherein the space potential generator comprising: a transformer that is formed by magnetically connecting a primary coil and a secondary coil; a feedback control circuit that feeds back one terminal of the secondary coil to one terminal of the primary coil to adjust a voltage of the secondary coil; an output control portion that is provided on the other terminal of the secondary coil to impart a low frequency vibration to an output of the secondary coil; and a static electricity discharger that is formed of a conductive material and provided on the other terminal of the secondary coil via the output control portion, wherein the space potential generator does not have a grounding electrode, a current flowing through the secondary coil is a weak current having a range of 0.002 to 0.2 A, an electric field of a predetermined voltage is formed in a surrounding space of the static electricity discharger by the static electricity discharged from the static electricity discharger, and the electric field is formed in the oil tub of the fryer by installing the static electricity discharger in the oil tub of the fryer.

The static electricity discharger can be covered with an insulating member having a predetermined insulating property suitable for allowing the static electricity discharger to discharge a static electricity of a predetermined voltage to the oil in the oil tub.

The space potential generator of the present invention includes: a transformer that is formed by magnetically connecting a primary coil and a secondary coil; a feedback control circuit that feeds back one terminal of the secondary coil to one terminal of the primary coil to adjust a voltage of the secondary coil; an output control portion that is provided on the other terminal of the secondary coil to impart a low frequency vibration to an output of the secondary coil; and a static electricity discharger that is formed of a conductive material and provided on the other terminal of the secondary coil via the output control portion, wherein the space potential generator does not have a grounding electrode, a current flowing through the secondary coil is a weak current having a range of 0.002 to 0.2 A, the static electricity discharger is covered with an insulating member having a predetermined insulating property suitable for allowing the static electricity discharger to discharge a static electricity of a predetermined voltage to a surrounding space, and the electric field of a target voltage is formed in a surrounding space of the static electricity discharger by the static electricity discharged from the static electricity discharger. Therefore, high voltage can be generated on the secondary coil side by the action of the feedback control circuit and the output control portion. In addition, since delay is caused in the output of the secondary coil, the low frequency vibration is imparted to the output of the secondary coil. From the above, the static electricity discharger provided on the other terminal of the secondary coil is physically vibrated at a low frequency. Since the space potential generator of the present invention does not have a grounding electrode and the static electricity discharger is covered with the insulating material, corona discharge is not generated. Therefore, the static electricity generated around the static electricity discharger is not discharged by insulation breakdown, and the static electricity is spread in the space by a fluctuation of the low frequency vibration. As a result, the electric field can be formed in a wide range.

From the above, the voltage of the predetermined value is directly applied to the object placed in the electric field formed around the static electricity discharger. Thus, an effect of keeping freshness of the object can be obtained.

Since a periphery of the static electricity discharger is covered with the insulating member, the static electricity discharger does not generate corona discharge regardless of the shape of the static electricity discharger. Thus, the shape of the static electricity discharger can be determined without limitation.

Although there is no risk of an electric shock even if a person touches the static electricity discharger because the current flowing in the secondary coil is the weak current having a range of 0.002 to 0.2 A in the space potential generator of the present invention, a sense of security is increased remarkably by covering a periphery of the static electricity discharger with the insulating member compared to the state that the static electricity discharger is barely exposed. Furthermore, even if current of high value is flowed in the secondary coil by some mistake, there is no risk of an electric shock caused by direct contact. From the above, safety is improved because a risk of the electric shock to a human body can be completely eliminated not only when using the device but also when installing and transferring the device.

At least 5 V of voltage should be directly applied the object to obtain an effect of keeping freshness. Therefore, a voltage value of the static electricity discharged from the static electricity discharger via the insulating member can be specified according to a size of the space in which the electric field is formed so as to form the electric field capable of applying a voltage of at least 5 V to the object existed in the surrounding space of the static electricity discharger.

In the space potential generator of the present invention, the voltage of the secondary coil is adjusted by feeding back one terminal of the secondary coil to one terminal of the primary coil by using the feedback control circuit. As a result, the devise itself can be downsized.

The static electricity discharger is formed by the conductive plate, and the static electricity is discharged from the plate surface of the conductive plate. Therefore, an area of discharging the static electricity in the static electricity discharger can be increased. As a result, the electric field can be formed in a wider range.

The freshness-keeping device of the present invention includes: a space potential generator; and a compartment for determining a freshness-keeping space formed around the static electricity discharger of the space potential generator, wherein the space potential generator includes: a transformer that is formed by magnetically connecting a primary coil and a secondary coil; a feedback control circuit that feeds back one terminal of the secondary coil to one terminal of the primary coil to adjust a voltage of the secondary coil; an output control portion that is provided on the other terminal of the secondary coil to impart a low frequency vibration to an output of the secondary coil; and a static electricity discharger that is formed of a conductive material and provided on the other terminal of the secondary coil via the output control portion, wherein the space potential generator does not have a grounding electrode, a current flowing through the secondary coil is a weak current having a range of 0.002 to 0.2 A, the static electricity discharger is covered with an insulating member having a predetermined insulating property suitable for allowing the static electricity discharger to discharge a static electricity of a predetermined voltage to a surrounding space, and an electric field of a target voltage is formed in a surrounding space by the static electricity discharged from the static electricity discharger, and the electric field is formed in the freshness-keeping space by discharging the static electricity from the static electricity discharger of the space potential generator to keep a freshness of a food in the freshness-keeping space. Therefore, the voltage can be directly applied to the object such as the food in the freshness-keeping space even if the object is not directly contact with the static electricity discharger. As a result, freshness keeping period of the food can be extended and bacteria growth can be suppressed.

Since the low frequency vibration is imparted to the output of the secondary coil in the space potential generator, the static electricity discharger provided on the other terminal of the secondary coil side is physically vibrated at a low frequency. In addition, a grounding electrode is not provided and the static electricity discharger is covered with the insulating member. From the above, the static electricity generated around the static electricity discharger is not discharged by insulation breakdown, and the static electricity is spread in the space by a fluctuation of the low frequency vibration to form the electric field in a wide range. Thus, the electric field can be efficiently formed in whole the freshness-keeping space.

Specifically, if the freshness-keeping device of the present invention is a refrigerator having a refrigerating compartment, a freezing compartment and a chilling compartment, for example, by installing the static electricity discharger in the refrigerating compartment, the electric field can be formed also in the other compartments (the freezing compartment and the chilling compartment) using circulation of cold air.

The freshness-keeping device of the present invention can be formed by installing the space potential generator in an existing refrigerator. Otherwise, the space potential generator can be installed on a refrigerator in a manufacturing process of the refrigerator, for example. In this case, the static electricity discharger is embedded in a wall or a partition of the refrigerator, and the wall or the partition of the refrigerator functions as the insulating member. Therefore, the insulating member for exclusive use is not required and therefore manufacturing cost can be reduced. In addition, an outer appearance is improved because the static electricity discharger is embedded in the wall or the partition and unevenness is not generated inside the static electricity discharger, being different from the case where the static electricity discharger is post-installed.

The compartment for determining the freshness-keeping space can be anything as long as it has an inside space capable of storing the food or the like. For example, the compartment for determining the freshness-keeping space can be a home-use refrigerator/freezer, a business-use large-size prefabricated refrigerator/freezer, a food storage and a store. In any cases, since the voltage of the predetermined value is directly applied to the object placed in the freshness-keeping space, freshness of the object can be kept and bacteria growth can be suppressed.

The object stored in the freshness-keeping space for keeping freshness is not limited to the food. The object can be anything such as oil. In this case, the compartment for determining the freshness-keeping space is formed by the fryer, and freshness of the oil stored in the fryer can be kept.

The fryer provided with the space potential generator of the present invention includes: a space potential generator; and a fryer having an oil tub, wherein the space potential generator comprising: a transformer that is formed by magnetically connecting a primary coil and a secondary coil; a feedback control circuit that feeds back one terminal of the secondary coil to one terminal of the primary coil to adjust a voltage of the secondary coil; an output control portion that is provided on the other terminal of the secondary coil to impart a low frequency vibration to an output of the secondary coil; and a static electricity discharger that is formed of a conductive material and provided on the other terminal of the secondary coil via the output control portion, wherein the space potential generator does not have a grounding electrode, a current flowing through the secondary coil is a weak current having a range of 0.002 to 0.2 A, an electric field of a predetermined voltage is formed in a surrounding space of the static electricity discharger by the static electricity discharged from the static electricity discharger, and the electric field is formed in the oil tub of the fryer by installing the static electricity discharger in the oil tub of the fryer. Therefore, deterioration of the oil can be suppressed, generation of impurities can be reduced, time required for frying can be reduced, fried food can be prevented from being colored due to deterioration of oil, odor can be prevented from being transferred to the food, oil smoke in the kitchen is prevented, and odor can be prevented from being transferred to the cloths.

The static electricity discharger can be covered with an insulating member having a predetermined insulating property suitable for allowing the static electricity discharger to discharge a static electricity of a predetermined voltage to the oil in the oil tub. Since the static electricity discharger is covered with the insulating member, a sense of security is increased remarkably compared to the state that the static electricity discharger is barely exposed. Furthermore, even if current of high value is flowed in the secondary coil by some mistake, there is no risk of an electric shock caused by direct contact. From the above, safety is improved because a risk of the electric shock to a human body can be completely eliminated not only when using the device but also when installing and transferring the device.

The static electricity discharger is formed by the conductive plate and the static electricity is discharged from the plate surface of the conductive plate. Therefore, an area of

BRIEF DESCRIPTION OF THE DRAWINGS

FIG. 4 is a table showing a result of an ordinary temperature preservation test of food using the space potential generator 1 in which the static electricity discharger is not covered with the insulating material.

FIG. 5 is a table showing a result of an ordinary temperature preservation test of food using the space potential generator 1 in which the static electricity discharger is not covered with the insulating material.

FIG. 6 is a table showing a result of an ordinary temperature preservation test of food using the space potential generator 1 in which the static electricity discharger is not covered with the insulating material.

FIG. 15A and FIG. 15B show an example of a supporting member to install a static electricity discharger 8 of the space potential generator 1.

FIG. 16 is a table showing a result comparing a frozen state in the space potential generator 1.

DETAILED DESCRIPTION OF THE INVENTION

Hereafter, with reference to drawings, an embodiment of a space potential generator, and a freshness-keeping device provided with the space potential generator of the present invention will be explained. Note that the space potential means, for example, a potential difference and a voltage value measured in the air.

Figures 1, 2:
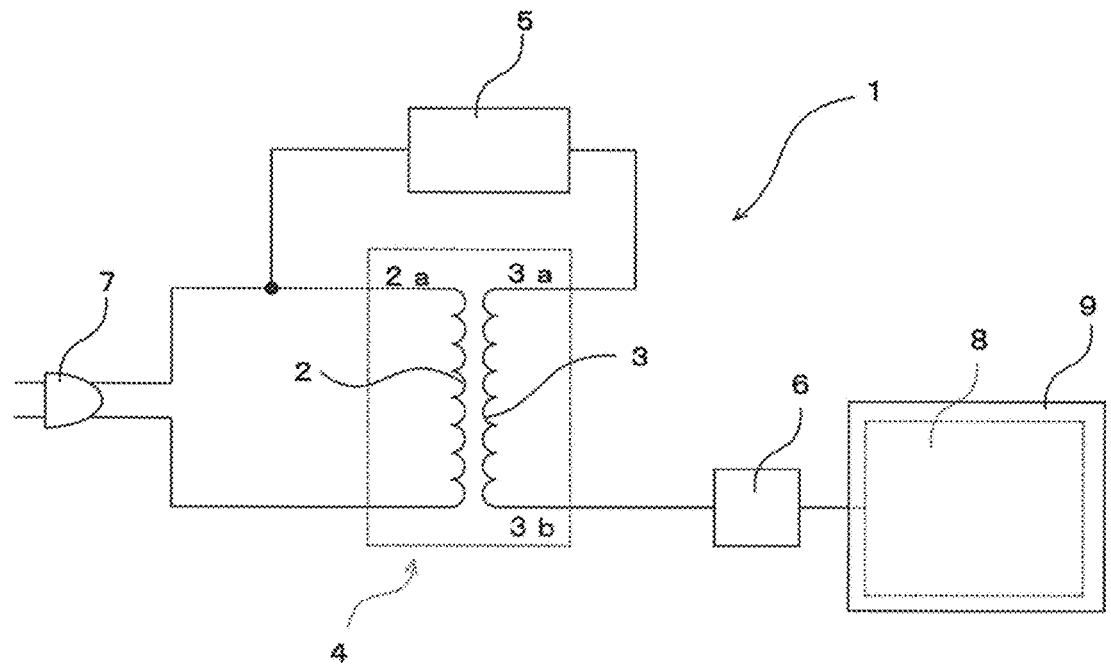
FIG. 1 is a circuit diagram showing a configuration of a space potential generator of the present invention.
FIG. 2 is a table showing a result of a thawing test of food using a space potential generator 1 in which a static electricity discharger is not covered with an insulating material.

FIG. 1 is a circuit diagram showing a configuration of a space potential generator of the present invention.

As shown in the figure, a space potential generator 1 includes a transformer 4, which is formed by magnetically connecting a primary coil 2 and a secondary coil 3.

A terminal 3a, which is one terminal of the secondary coil 3, is connected to a terminal 2a, which is one terminal of the primary coil 2, via a feedback control circuit 5 for adjusting a voltage of the secondary coil 3. The other terminal (i.e. output terminal) 3b of the secondary coil 3 is connected to a static electricity discharger 8 via an output control portion 6 for applying a low frequency vibration to the output.

In FIG. 1, a reference numeral 7 indicates an AC input plug.

The static electricity discharger 8 is formed of a conductive material. A shape of the static electricity discharger 8 can be a bar-shape, a plate-shape, and a curved plate-shape.

If the static electricity discharger 8 is a plate-shape, a plurality of openings, slits or the like can be preferably formed so as not to obstruct air flow in the installed space.

Furthermore, a periphery of the static electricity discharger 8 is covered with an insulating member 9. If the static electricity discharger is a plate-shape, the insulating member 9 can be formed to sandwich the plate-shape static electricity discharger from above and below, for example. If the static electricity discharger is a liner-shape or a bar-shape, the insulating member 9 can be formed as a cylindrical body so as to insert the static electricity discharger into it, for example. An insulation performance of the insulating member is determined based on a voltage value of the static electricity discharger 8, a size of the space of the electric field formed by grounding the static electricity discharger 8, and a target value of the voltage directly applied to the object placed in the space. Specifically, the target value of the voltage is preferably 5 V or more. In other words, the insulating member does not completely insulate the static electricity discharger. A material and a thickness of the insulating member can be determined so as to form a static electricity of a predetermined voltage required for forming an electric field for directly applying a voltage of the target value to the object.

By using the space potential generator 1 configured as explained above, a current generated on the side of the secondary coil 3 is fed back to the primary coil 2 by the feedback control circuit 5. Therefore, high voltage can be obtained on the side of the secondary coil 3 even if the number of turns of the coil is small.

In addition, the feedback control circuit 5 and the output control portion 6 are formed to cause a delay in the circuit. As a result, low frequency vibration is applied to the output of the secondary coil 3. A vibration frequency of the low frequency vibration applied to the static electricity discharger, which is the output of the secondary coil 3, is preferably 40 to 60 Hz. However, the range is not limited to the above range. For example, low frequency range can be expanded.

From the above, the static electricity discharger is vibrated at a low frequency, and the vibration is transferred to the space around the static electricity discharger as a fluctuation. In addition, a grounding electrode is not provided and the static electricity discharger is covered with the insulating material. Therefore, the static electricity discharged from the static electricity discharger is spread widely in the space around the static electricity discharger by the fluctuation, and the electric field of a predetermined voltage is formed on the space around the static electricity discharger.

In the space potential generator 1 of the present invention, high voltage is generated at the output of the secondary coil 3 by the feedback control circuit 5 and the output control portion 6, and the low frequency vibration is added to the output of the secondary coil 3. In addition, the output is only one line of a terminal 3b, and a grounding electrode is not provided. Therefore, the static electricity generated around the static electricity discharger 8 is not discharged by insulation breakdown, and electric charge is propagated and spread in the space by the fluctuation of the low frequency vibration. Thus, the electric field can be widely formed. Since the static electricity is widely discharged from the static electricity discharger 8, the electric field of high voltage is formed around the static electricity discharger 8. Specifically, the electric field is formed in a range of a radius of approximately 1.5 m around the static electricity discharger 8. If cold air or wind is provided, the electric charge is spread widely and therefore the area of the electric charge can be spread.

Since the static electricity discharger is covered with the insulating member, a sense of security is increased remarkably compared to the state that the static electricity discharger is barely exposed. Furthermore, even if a current of high value is flowed in the secondary coil by some mistake, there is no risk of an electric shock caused by direct contact and there is no possibility of corona discharge.

In the above described space potential generator 1, only by installing one output line and one static electricity discharger 8 in an arbitrary place such as a freezer, a refrigerator, a thawing chamber, a showcase, a food preservation chamber, an ISO container, a transport truck, an ordinary-temperature warehouse, and a refrigerator or a freezer in a fishing boat, an electric field of high voltage can be formed in whole the space (case, room or vehicle) in which the static electricity discharger 8 is installed. Therefore, freshness-keeping function using the electric field can be cheaply and easily added to the desired place.

If the static electricity discharger is embedded in a wall, a ceiling and/or a partition plate when producing the freezer, the refrigerator, the thawing chamber, the showcase, the food preservation chamber, the ISO container and the ordinary-temperature warehouse, the freshness-keeping function can be preliminarily added to the freezer, the refrigerator, the thawing chamber, the showcase, the food preservation chamber, the ISO container and the ordinary-temperature warehouse. In this case, since the static electricity discharger is embedded in the wall, the ceiling and/or the partition plate, an outer appearance is improved and a sense of security is increased compared to the state that the static electricity discharger is barely exposed. In addition, since the wall, the ceiling and/or the partition plate function as the insulating material, the insulating material for exclusive use is not required. Furthermore, even if a current of high value is flowed by mistake, there is no risk of an electric shock.

In a case of a large warehouse, a plurality of shelves having a length of 8 m or more is installed in the warehouse, and the shelves can be moved to the right and left so that the pallets placed on the shelves are easily taken out from the shelves by a forklift when shipping. In the above described space potential generator 1, since the static electricity discharger 8 is separate from a shelf board, even if the shelves are movable as described above, the static electricity discharger 8 can be easily installed.

In addition, batteries can be used as an electric power source. In this case, the static electricity discharger 8 is portable for three days by using sixteen size D batteries connected in parallel. In addition, the batteries can be used in combination with an AC power source.

In the above described electric field, the static electricity discharger 8 is vibrated at a low frequency and the fluctuation is transferred in the space. Therefore, the static electricity is spread by the fluctuation and the voltage of a predetermined value or more is applied to whole the space. Even if the food to be preserved is not in contact with the static electricity discharger 8, the voltage of 5 V or more is directly applied to the object such as the food to be preserved. Thus, an oxidation inhibition effect can be obtained by charging negative electron and positive electron, and a bacteria growth suppressing effect can be obtained by high voltage.

In addition, the food is not frozen even below the freezing point in the electric field. For example, chicken is not frozen until a temperature of −3° C., and beef and pork are not frozen until a temperature of −4° C. Thus, the food can be preserved at a low temperature without being frozen. From the above, tissue destruction, which occurs when thawing the frozen object, can be prevented. Thus, the object can be preserved for a long period without being frozen while keeping freshness.

The voltage of the electric field is high at a place near the static electricity discharger 8, and becomes lower as being distant from the static electricity discharger 8. A weak electric field is enough for some objects to be preserved, while a high electric field is required for the other objects. Therefore, the best effect can be obtained by arranging the static electricity discharger 8 on a suitable place according to a preservation place and a configuration of the case.

In the conventional electric field forming device, when forming the electric field in a home-use refrigerator or a business-use refrigerator divided into a plurality of compartments, such as a refrigerating compartment, a vegetable compartment and a freezing compartment, the electrode shelf board should be installed on each of the compartments or a pair of electrodes should be installed on each of the compartments. However, in the space potential generator 1 of the present invention, the static electricity discharger 8 becomes an antenna and a high voltage can be applied to whole the space. Therefore, even if the food to be preserved is not in contact with the static electricity discharger 8, an oxidation inhibition effect can be obtained for the food to be preserved by charging negative electron and positive electron, and a bacteria growth suppressing effect can be obtained for the food to be preserved by high voltage. Even if the static electricity discharger 8 is not provided in each of the compartments, only by installing one static electricity discharger 8 on the center, an oxidation inhibition effect can be obtained in whole the refrigerator by charging negative electron and positive electron together with the cold air, and a bacteria growth suppressing effect can be obtained in whole the refrigerator by the high voltage.

If the temperature is adjusted to increase amino acid, aging of the food such as meat can be accelerated. The meat is normally matured for more than 15 days. Therefore, a special equipment is required for suppressing bacteria and controlling a humidity during such a period. In addition, strict management by a specialist is required. If the space potential generator 1 is installed, bacteria are suppressed and the best effect of aging can be obtained in a short time. If the space potential generator 1 is installed in the conventional refrigerator, tons of beef, pork and chicken can be aged and preserved in a short time and at a low cost.

FIG. 2 is a table showing a result of a thawing test of food using the above described space potential generator 1. Note that the static electricity discharger was not covered with the insulating material in the test because the test was for confirming the effect of keeping freshness in the electric field, not the effect of safety and outer appearance.

In the test, three static electricity discharger 8 were installed on each of longitudinal side walls of a thawing chamber having an inner dimension of 6 m×6 m×3 m at an interval of 2 m at a height of 1.5 m, the electric field having a spatial voltage of 1 V was formed in the thawing chamber by the static electricity discharged from the static electricity discharger 8, and the space potential generator 1 was adjusted so that the voltage of 10 V was applied to the food placed inside. A dimension of the static electricity discharger 8 was width 30 cm×height 15 cm.

A temperature in the thawing chamber was 5° C. and a humidity in the thawing chamber was 65%.

In the above described conditions, 2 tons of beef, 1 ton of pork and 1 ton of chicken were thawed taking 12 to 15 hours. When the space potential generator 1 of the present invention was not installed, dripping was seen all over the floor. On the other hand, when the space potential generator 1 is installed, the dripping was reduced by 95%. By installing the space potential generator 1, substantial and tasty protein, peptide, amino acid, lactic acid, vitamin B complex and various salts, which are included in the dripping, can be prevented from flowing out although they usually flew out when thawing the food. In addition, profitability could be increased by avoiding weight reduction, cleaning work could be reduced, and working process of hygiene management could be improved.

FIGS. 3 to 6 are tables showing a result of an ordinary temperature preservation test of food using the above described space potential generator 1. Note that the static electricity discharger was not covered with the insulating material in the test because the test was for confirming the effect of keeping freshness in the electric field, not the effect of safety and outer appearance.

In all the tests, two static electricity discharger 8 were installed side by side on each of longitudinal side walls of a thawing chamber having an inner dimension of depth 5 m×width 6 m×height 2.5 m at a height of 1.5 m, the electric field having a spatial voltage of 20 V was formed in the thawing chamber by the static electricity discharged from the static electricity discharger 8, and the space potential generator 1 was adjusted so that the voltage of 30 V was applied to the food placed inside. A dimension of the static electricity discharger 8 was width 30 cm×height 15 cm.

A temperature in the thawing chamber was 15° C., a humidity in the thawing chamber was 35%, and a preservation period was 10 days.

In the above described condition, a comparison is performed between the cases of with and without the space potential generator 1.

Figure 3:
FIG. 3 is a table showing a result of an ordinary temperature preservation test of food using the space potential generator 1 in which the static electricity discharger is not covered with the insulating material.

FIG. 3 is a table showing a result of banana, cucumber and eggplant.

In the case with the space potential generator 1, the banana could be eaten even after 10 days because color was changed little and banana fresh was not oxidized. On the other hand, in the case without the space potential generator 1, the banana could not be eaten after 5 days because the color was completely turned brown and banana fresh was oxidized.

In the case with the space potential generator 1, the cucumber could be eaten even after 10 days because moisture and freshness were kept. On the other hand, in the case without the space potential generator 1, the cucumber could not be eaten after 4 days because the cucumber was oxidized, discolored, and moisture inside was lost.

In the case with the space potential generator 1, the eggplant could be eaten after 10 days because the eggplant was not oxidized although a little dried. On the other hand, in the case without the space potential generator 1, the eggplant could not be eaten after 5 days because the eggplant was dried and oxidized.

FIG. 4 is a table showing a result of green pepper, carrot, broccoli and Chinese cabbage.

In the case with the space potential generator 1, the green pepper could be eaten after 10 days because moisture was kept inside although a little shriveled. On the other hand, in the case without the space potential generator 1, the green pepper could not be eaten after 5 days because the green pepper shriveled a lot and completely dried.

In the case with the space potential generator 1, the carrot could be eaten after 10 days because moisture inside was kept and color inside was not changed although color of skin was changed. On the other hand, in the case without the space potential generator 1, the carrot could not be eaten after 5 days because color inside was also changed.

In the case with the space potential generator 1, the broccoli could be eaten after 8 days although color was changed to yellow. On the other hand, in the case without the space potential generator 1, the broccoli could not be eaten after 4 days because color of clusters was changed to black.

In the case with the space potential generator 1, the Chinese cabbage could be eaten after 10 days because moisture was kept and leafs were kept crispy. On the other hand, in the case without the space potential generator 1, the Chinese cabbage could not be eaten after 5 days because the Chinese cabbage was dried and leafs were completely open.

FIG. 5 is a table showing a result of cabbage, komatsuna (Brassica campestris), spinach and scallion.

In the case with the space potential generator 1, the cabbage could be eaten after 8 days because a core was kept white. On the other hand, in the case without the space potential generator 1, the cabbage could not be eaten after 4 days because the core became black.

In the case with the space potential generator 1, the komatsuna could be eaten after 8 days because many parts were kept green and moisture was kept. On the other hand, in the case without the space potential generator 1, the komatsuna could not be eaten after 4 days because leafs were completely dried and stems were dried.

In the case with the space potential generator 1, the spinach could be eaten after 10 days because many parts were kept green and moisture was kept. On the other hand, in the case without the space potential generator 1, the spinach could not be eaten after 3 days because leafs were completely dried and stems were also dried.

In the case provided with the space potential generator 1, the scallion could be eaten after 10 days because many parts were kept green and leafs were kept fresh. On the other hand, in the case without the space potential generator 1, the scallion could not be eaten after 3 days because the scallion shriveled as a whole.

FIG. 6 is a table showing a result of celery, green onion, lettuce and tomato.

In the case with the space potential generator 1, the celery could be eaten after 6 days because freshness was kept. On the other hand, in the case without the space potential generator 1, the celery could not be eaten after 3 days because the celery was completely dried.

In the case with the space potential generator 1, the green onion could be eaten after 10 days because many parts were kept green and moisture was kept. On the other hand, in the case without the space potential generator 1, the green onion could not be eaten after 4 days because the green onion was completely dried and stems were also dried.

In the case with the space potential generator 1, the lettuce could be eaten after 10 days because moisture was kept. On the other hand, in the case without the space potential generator 1, the lettuce could not be eaten after 4 days because the lettuce was completely dried and spoilage began.

In the case with the space potential generator 1, the tomato could be eaten after 12 days because moisture was kept and inside was kept fresh. On the other hand, in the case without the space potential generator 1, the tomato could not be eaten after 6 days because the moisture was lost although an outer appearance was same.

From the above test results, if the space potential generator 1 is used, only by installing the static electricity discharger 8 in the room or the compartment, good electric field is formed in the room or the compartment. Thus, it is confirmed that a preservation period of the food at an ordinary temperature can be extended in the room or the compartment in which the electric field is formed.

Next, based on FIG. 7, a test for an effect of preventing bacteria growth by using the space potential generator of the present invention will be explained. In the test, the static electricity discharger covered with the insulating member was used.

In the test, beef was entered in refrigerators and the number of the bacteria per 1 g of the beef was measured in the 3rd day, the 5th day and the 7th day. Following four refrigerators were compared:

a refrigerator (inside temperature 5° C.), without the space potential generator;
a refrigerator (inside temperature 5° C.), with the space potential generator;
a refrigerator (inside temperature 2° C.), with the space potential generator; and
a refrigerator (inside temperature 2° C.), with the space potential generator.

A humidity of all the refrigerators was 65 to 75%. An inside area of all the refrigerators was width 80 cm×height 150 cm×depth 50 cm.

The static electricity discharger of the space potential generator installed in the compartment was formed of an electrode having a dimension of height 5 cm×width 10 cm and thickness 1 mm. In addition, both sides of the static electricity discharger were covered (sandwiched) with insulating members made of an insulating plastic (polyethylene plate). A dimension of an upper insulating member was height 12 cm×width 17 cm and thickness 5 mm. A dimension of a lower insulating member was height 12 cm×width 17 cm and thickness 4 mm.

A voltage input into the space potential generator was set to 800 V so that a voltage directly applied to the beef placed in the refrigerator became 30 V.

Figures 7, 8:
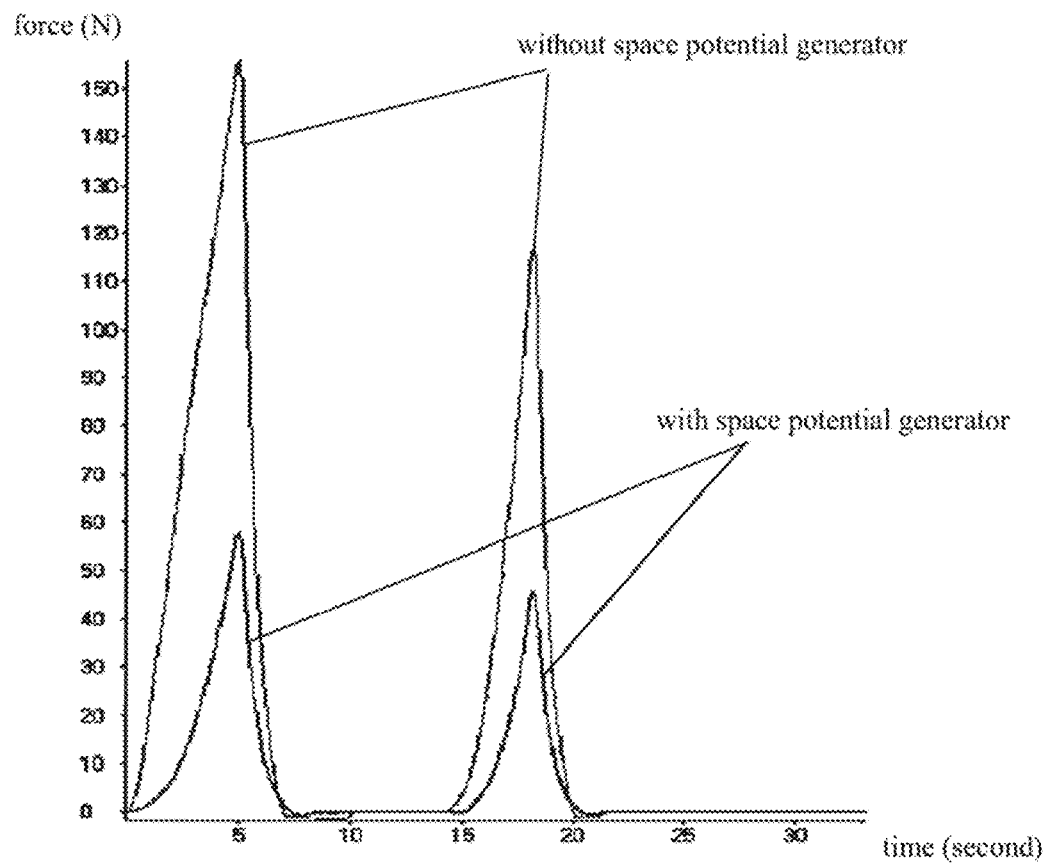
FIG. 7 is a table showing a result of a comparative test for an effect of preventing bacteria growth by using the space potential generator of the present invention.
FIG. 8 is a graph showing a result of a test for an effect in a frozen state of food or the like below the freezing point using the space potential generator of the present invention. A vertical axis shows a force applied to the food, and a horizontal axis shows a time.

FIG. 7 is a table showing a result of a comparative test.

From FIG. 7, it was confirmed that the number of bacteria was extremely different between the refrigerator provided with the space potential generator and the refrigerator not provided with the space potential generator. Thus, by installing the space potential generator, bacteria growth could be prevented considerably regardless of the temperature.

Conventionally, the food was frozen to keep freshness of the food. In case the food was not frozen, temperature must be carefully controlled. By using the space potential generator of the present invention, freshness of the food can be very easily controlled because sufficient effect of preventing bacteria growth can be obtained as described above.

Next, a test for an effect in a frozen state below the freezing point using the space potential generator of the present invention will be explained.

In the test, chicken was entered in a home-use refrigerator provided with the space potential generator and not provided with the space potential generator, an inside temperature was set to −3° C., and a frozen state of the chicken was observed after 48 hours passed.

An inside area of the refrigerator used in the test was width 50 cm×height 30 cm×depth 45 cm. The static electricity discharger installed in the refrigerator was formed of an electrode having a dimension of 5 cm×10 cm. Both sides of the static electricity discharger were covered with an insulating plastic (polyethylene plate).

A dimension of a front side of the insulating member was height 12 cm×width 17 cm×thickness 7 mm. A reverse side was height 12 cm×width 17 cm and thickness 6 mm.

An input voltage was set to 1000 V so that a voltage directly applied to the chicken became 20 V.

FIG. 8 is a graph showing a result of the above explained test. A vertical axis shows a force (N) applied to the food, and a horizontal axis shows a time.

As shown in FIG. 8, the test was performed by pressing a test probe twice each against the chicken frozen by the home-use refrigerator not provided with the space potential generator and the chicken frozen by the home-use refrigerator provided with the space potential generator.

From FIG. 8, it was confirmed that the chicken in the refrigerator not provided with the space potential generator was harder three times or more than the chicken in the refrigerator provided with the space potential generator. In addition, elasticity was completely lost in the chicken in the refrigerator not provided with the space potential generator. On the other hand, elasticity was remained in the chicken in the refrigerator provided with the space potential generator.

This means that the chicken was frozen in the refrigerator not provided with the space potential generator, while the chicken is not frozen in the refrigerator provided with the space potential generator.

From the above, it was confirmed that the food can be preserved in the refrigerator of −3° C. without freezing the food by using the space potential generator of the present invention. Therefore, thawing is not required and a problem of flowing out flavor caused by tissue destruction is prevented, for example.

Next, a test for an effect in a frozen state in −7° C. using the space potential generator of the present invention will be explained.

In the test, pork, beef and fish were entered in a home-use refrigerator not provided with the space potential generator, an inside temperature was set to −4° C., and the pork, the beef and the fish were taken out after 48 hours passed. The pork, the beef and the fish were completely frozen and could not be cut by a kitchen knife.

An inner area of the above described home-use refrigerator was width 50 cm×height 30 cm×depth 45 cm.

The space potential generator was installed on the same home-use refrigerator, pork, beef and fish were entered in the home-use refrigerator, an inside temperature was set to −7° C., and the pork, the beef and the fish were taken out after 48 hours passed.

The static electricity discharger of the space potential generator used in the test was formed by an electrode having a dimension of depth 5 cm×width 10 cm. Both sides of the static electricity discharger were covered with acrylic plates (height 10 cm×width 15 cm×thickness 5 mm) as an insulating member. A voltage input into the space potential generator was set to 900 V so that a voltage directly applied to the pork, the beef and the fish placed in the refrigerator became 10 V.

The pork, the beef and the fish taken out of the refrigerator could be cut by a kitchen knife.

Furthermore, a test for an effect in a frozen state in −11.7° C. using the space potential generator of the present invention will be explained.

The space potential generator of the present invention was installed on a business-use prefabricated refrigerator having an inner area of width 3 m×height 2.5 m×depth 2 m, pork, beef and fish were entered in the refrigerator, an inside temperature was set to −11.7° C., and the pork, the beef and the fish were taken out after 72 hours passed.

The static electricity discharger of the space potential generator used in the test was formed by an electrode having a dimension of width 36 cm×height 16 cm×thickness 1 mm. Both sides of the static electricity discharger were covered with polycarbonate plates (height 43 cm×width 23 cm×thickness 5 mm) as an insulating member. A voltage input into the space potential generator was set to 2500 V so that a voltage directly applied to the pork, the beef and the fish placed in the refrigerator became 30 V.

The pork, the beef and the fish taken out of the refrigerator could be cut by a kitchen knife.

Next, a result of a comparative test for a thawed state of the food frozen in the electric field using the space potential generator of the present invention will be explained.

In the test, chicken was entered in a home-use refrigerator with and without the space potential generator, an inside temperature was kept to −18° C., the chicken was preserved for 72 hours to freeze the chicken, the chicken was taken out of the refrigerator, the chicken was spontaneously thawed for 10 hours, and a state of the chicken was compared.

An inside area of the home-use refrigerator used in the test was width 50 cm×height 30 cm×depth 45 cm. The static electricity discharger of the space potential generator was formed of an electrode having a dimension of height 5 cm×width 10 cm×thickness 1 mm. Both sides of the static electricity discharger were covered with plastic plates (height 10 cm×width 15 cm×thickness 3 mm). A voltage input into the space potential generator was set to 800 V so that a voltage directly applied to the chicken placed in the refrigerator became 20 V.

A weight of the chicken entered in the home-use refrigerator not provided with the space potential generator was 343.8 g, and 8.9 g of dripping came out from the chicken after thawing.

A weight of the chicken entered in the home-use refrigerator provided with the space potential generator was 468.5 g, and 1.8 g of dripping came out from the chicken after thawing.

Figure 9:
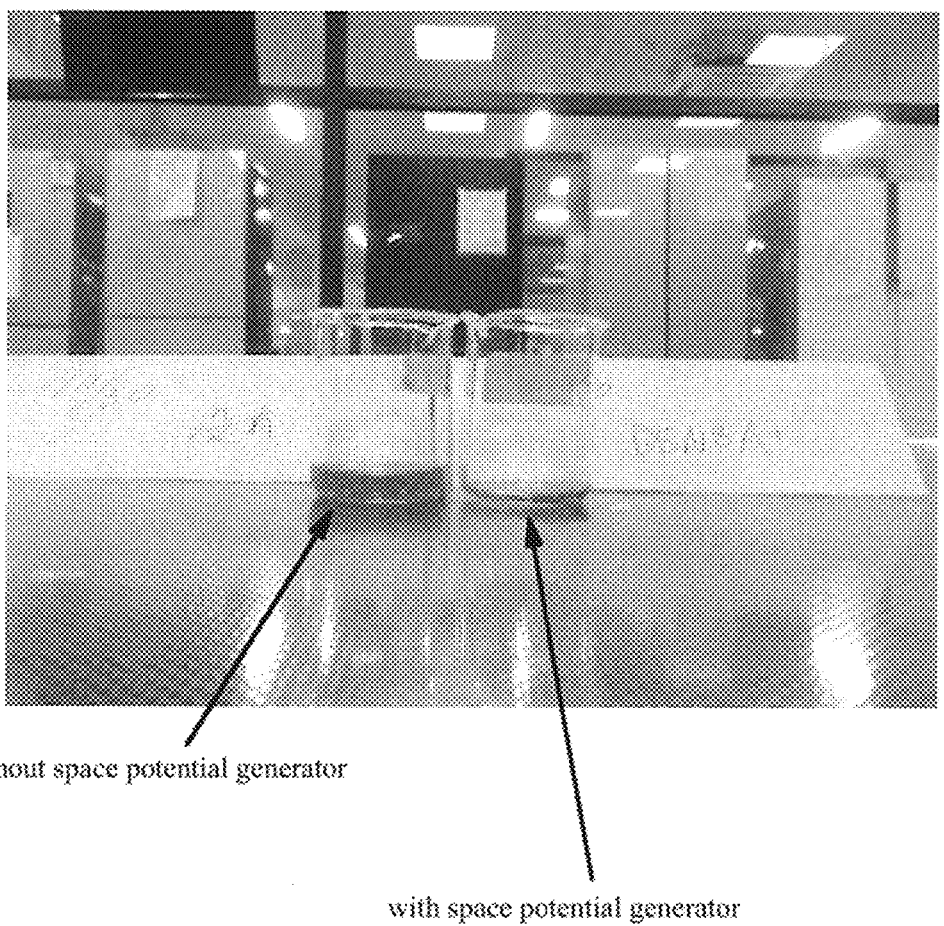
FIG. 9 shows a result of comparative test for an amount of dripping of the thawed food frozen in the electric field using the space potential generator of the present invention.

FIG. 9 is a figure showing an amount of dripping of the chicken after thawing.

From the above described test result, it was confirmed that the food frozen in the electric field generated by the space potential generator could be thawed without destroying cells, and water molecules could be frozen without destroying cells by a cluster effect in the space potential generator.

Next, a result of the above described freezing/thawing test using fresh-water fish will be explained.

In the test, a fresh-water fish stored in a bag was entered in a business-use prefabricated refrigerator with and without the space potential generator, an inside temperature was kept to −18° C., the fresh-water fish was preserved for 72 hours to freeze the fresh-water fish, the fresh-water fish was taken out of the refrigerator, the fresh-water fish was spontaneously thawed for 10 hours, and a state of the fresh-water fish was compared.

An inside area of the business-use prefabricated refrigerator used in the test was width 3 m×height 2.5 m×depth 2 m. The static electricity discharger of the space potential generator was formed of an electrode having a dimension of width 36 cm×height 16 cm×thickness 1 mm. Both sides of the static electricity discharger were covered with polycarbonate plates (height 43 cm×width 23 cm×thickness 5 mm). A voltage input into the space potential generator was set to 2500 V so that a voltage directly applied to the fresh-water fish placed in the refrigerator became 80 V.

The thawed state was compared. The thawed fresh-water fish frozen by the refrigerator not provided with the space potential generator could not be eaten because fish meat was spoiled emitting bad smell and a large amount of dripping came out.

On the other hand, the thawed fresh-water fish frozen by the refrigerator provided with the space potential generator could be eaten because the fish was fresh without emitting bad smell and dripping was little.

Figure 10:
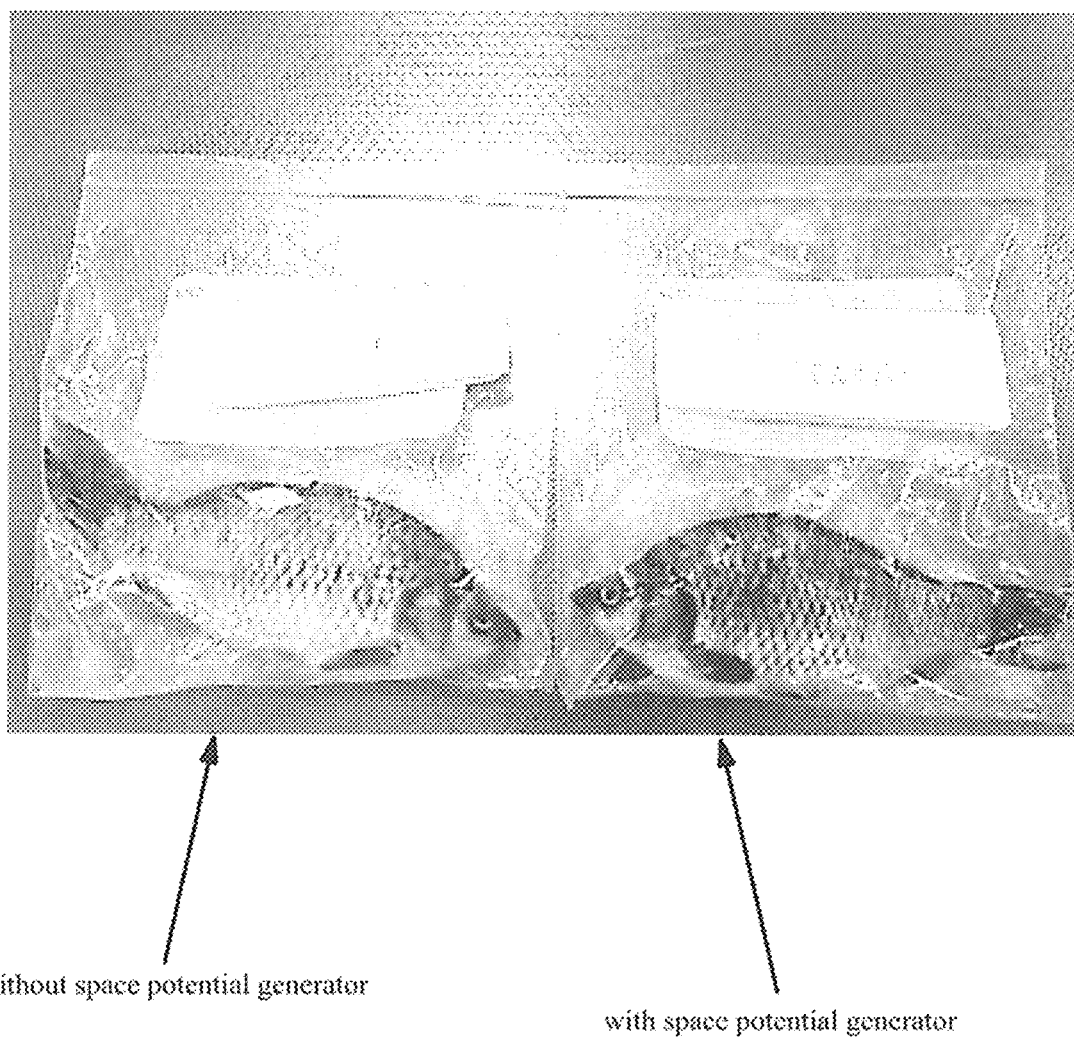
FIG. 10 shows a thawed state of a fresh-water fish frozen in the electric field using the space potential generator of the present invention.

FIG. 10 is a figure showing the thawed state of the fresh-water fish.

Also from the above described test result, it was confirmed that the food frozen in the electric field generated by the space potential generator could be thawed without destroying cells.

Next, with reference to FIGS. 11 to 16, an embodiment of a freshness-keeping device using the space potential generator will be explained as an application example of the space potential generator 1 of the present invention.

Figure 11A:
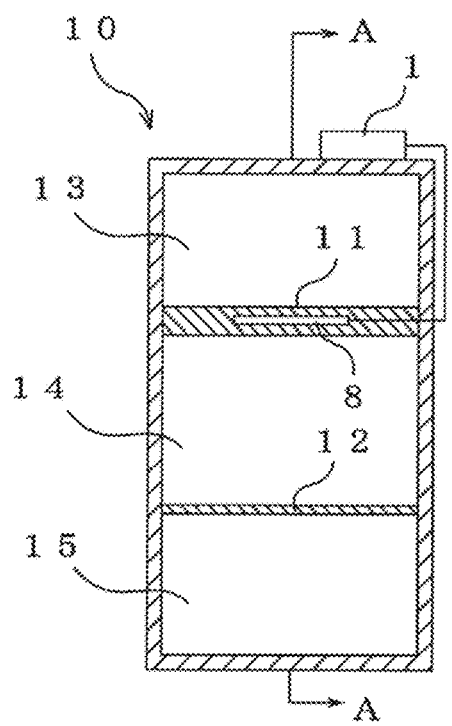
FIG. 11A is a schematic longitudinal cross-section view of a refrigerator provided with a space potential generator 1.
Figure 11B:
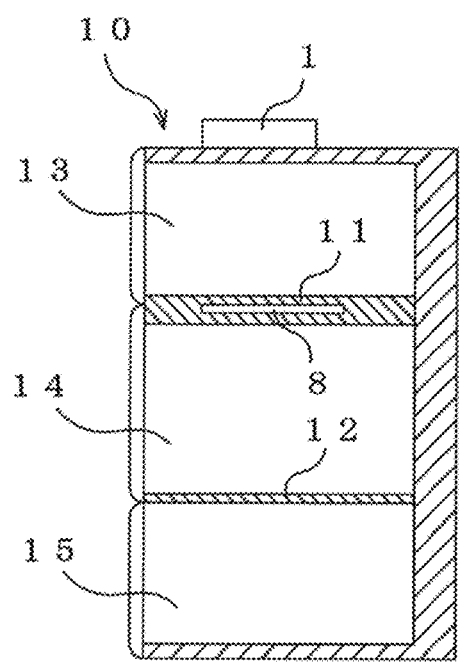
FIG. 11B is a schematic section view along line A-A of FIG. 11A.

FIG. 11A is a schematic longitudinal cross-section view of the refrigerator provided with the space potential generator 1. FIG. 11B is a schematic section view along line A-A of FIG. 11A.

In the figure, the reference numeral 10 indicates the refrigerator. Inside the refrigerator 10 is divided into three spaces by partition plates 11 and 12. A chilling compartment 13 is formed on the top, a refrigerating compartment 14 is formed on the middle, and a vegetable compartment 15 is formed on the bottom.

The static electricity discharger 8 of the space potential generator 1 is provided inside the partition plate 11 which is located between the chilling compartment 13 and the refrigerating compartment 14. In this case, the partition plate 11 functions as the insulating member of the present invention. Since the static electricity discharger 8 is installed inside the partition plate 11, the electrode is invisible from outside and a sense of security is increased. Furthermore, even if current of high value is flowed in the input side by mistake, there is no risk of directly contacting the electrode and an electric shock caused by direct contact can be prevented.

By installing the static electricity discharger 8 in this way, a strong electric field is formed on the chilling compartment 13 and the refrigerating compartment 14 because the static electricity discharger 8 is located nearby, and a weak electric field is formed on the vegetable compartment 15 because the static electricity discharger 8 is distant. Thus, an electric field environment suitable for the food to be preserved can be obtained.

In addition, if the static electricity discharger 8 is a plate-shape and a plurality of openings or slits is provided, the static electricity discharger 8 does not prevent air circulation when an air in the refrigerator is circulated by a fan provided in the refrigerator. Thus, the electric field environment in each compartment can be unified.

Although the static electricity discharger 8 is installed inside the partition plate 11 in the embodiment shown in FIG. 11, a place to install the static electricity discharger 8 is not limited to this embodiment. The static electricity discharger 8 can be installed in any place, for example, in a back board, a top board or other partition boards of the refrigerator 10.

Figure 12:
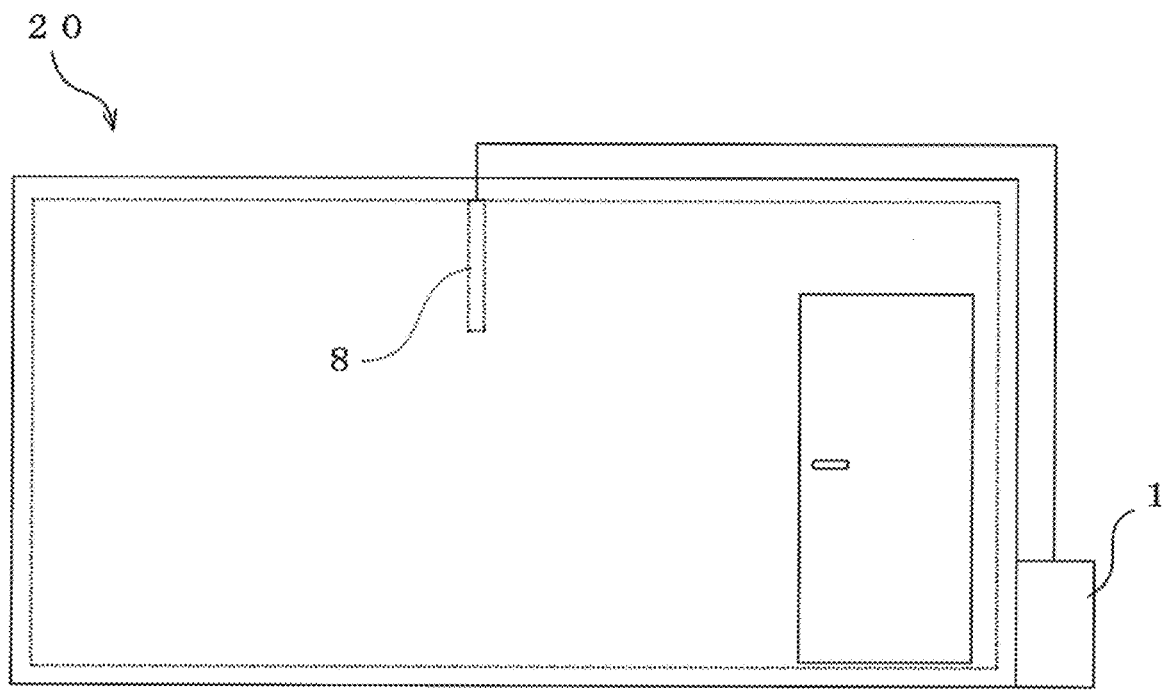
FIG. 12 is a schematic front view of a prefabricated refrigerator provided with the space potential generator 1.

FIG. 12 is a schematic front view of a prefabricated type refrigerator provided with the space potential generator 1.

In this embodiment, the static electricity discharger 8 of the space potential generator 1 is installed so as to be suspended from a ceiling wall of a prefabricated refrigerator 20. Although not shown in the figure, the static electricity discharger 8 is covered with the insulating member.

In this way, by installing the static electricity discharger 8 approximately at the center of the prefabricated refrigerator 20, the electric field can be uniformly formed in the space of the refrigerator.

Figure 13:
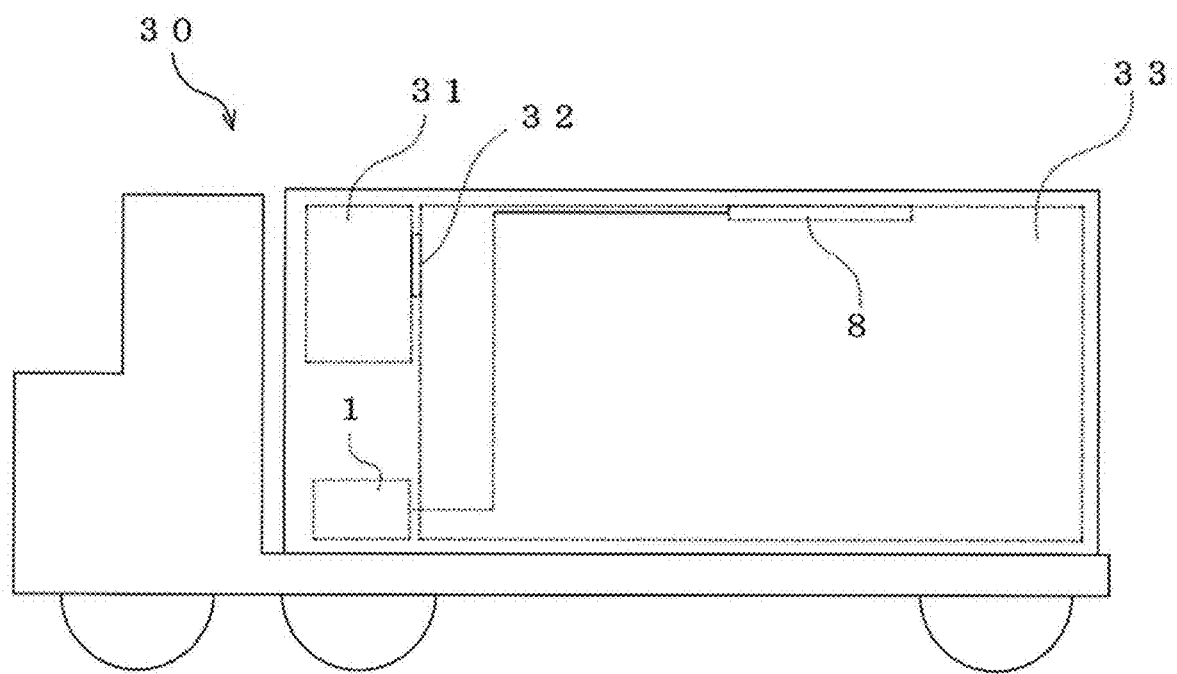
FIG. 13 is a schematic side view of a refrigerator car provided with the space potential generator 1.

FIG. 13 is a schematic side view of a refrigerator car provided with the space potential generator 1.

The reference numeral 30 means the refrigerator car. The refrigerator car 30 cools inside a refrigerator 33 by a cooler 31 via a cool air port 32.

The static electricity discharger 8 of the space potential generator 1 is installed on a ceiling wall of the refrigerator 33. Although not shown in the figure, the static electricity discharger 8 is covered with the insulating member. In this case, the space potential generator 1 is connected to a battery of the refrigerator car 30.

Figure 14:
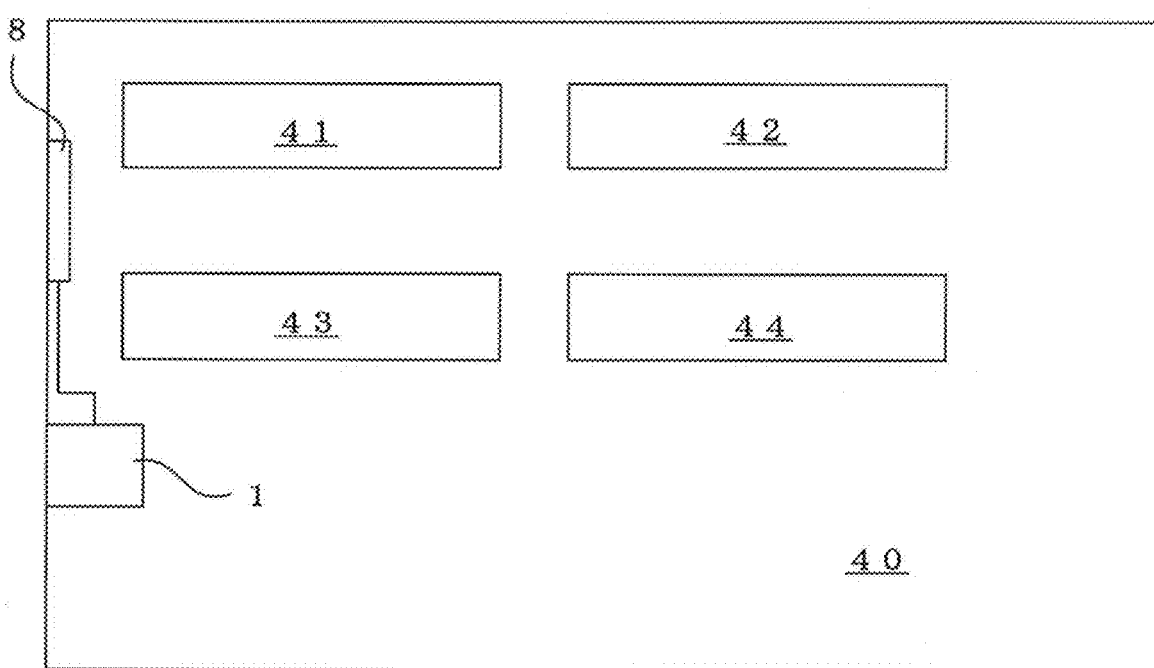
FIG. 14 is a schematic top view of a store provided with the space potential generator 1.

FIG. 14 is a schematic top view of a store provided with the space potential generator 1.

In a store 40, food display racks 41, 42, 43, 44 of an open type are provided. The static electricity discharger 8 of the space potential generator 1 is installed on a side wall near the food display racks 41, 42, 43, 44. Although not shown in the figure, the static electricity discharger 8 is covered with the insulating member.

The space potential generator 1 is operated, for example, at night when the store 40 is closed so as to form the electric field around the food display racks 41, 42, 43, 44 and extend a preservation period of the displayed food.

FIG. 15A and FIG. 15B show an example of a supporting member to install the static electricity discharger 8 of the space potential generator 1. Although not shown in the figure, the static electricity discharger 8 is covered with the insulating member.

FIG. 15A shows a supporting member 51 used for installing the static electricity discharger 8 of the space potential generator 1 so as to be vertically standing on a floor 50.

By using the supporting member 51 to support the static electricity discharger 8 vertically standing on the floor, an installation location of the static electricity discharger 8 can be more flexibly selected. Thus, the static electricity discharger 8 can be installed on a more optimum position.

FIG. 15B shows a supporting member 61 used for installing the static electricity discharger 8 of the space potential generator 1 so as to be suspended from a ceiling 60. A leg portion of the supporting member 61 is fixed to the ceiling 60 by a suitable fixing means 62.

By using the supporting member 61 to support the static electricity discharger 8 to be suspended from the ceiling, an installation location of the static electricity discharger 8 can be more flexibly selected. Thus, the static electricity discharger 8 can be installed on a more optimum position.

FIG. 16 is a table showing a result comparing a frozen state in the space potential generator 1.

Conventionally, a quick freezer of −60° C. was used so as to prevent deterioration of the food and not to destroy cells of the food when freezing.

On the other hand, in a prefabricated freezer or a cold storage warehouse, freezing can be done in the best condition by installing the space potential generator 1, setting the space potential generator 1 so that a space potential becomes 1 V and an applied voltage becomes 10 V, and setting a temperature to −18° C.

By installing the space potential generator 1, water molecules can be frozen without destroying cells by a cluster effect. In addition, the food is not required to be transferred from the quick freezer to the freezer because freshness keeping can be also done after freezing. Therefore, a cost of facility investment to buy the quick freezer is not required. In addition, by installing the space potential generator 1 in the conventional freezing equipment, electricity cost can be reduced and carbon dioxide emissions can be reduced.

FIG. 16 is a table showing a result comparing a case in which a mango having a size of height 15 cm and width 10 cm is frozen at −60° C. by using a quick freezer with another case in which the same mango is frozen at −18° C. by using the space potential generator 1.

In the case the mango was frozen at −60° C., since cold air of quick freezing was applied to the mango, moisture contained in the mango was lost and a surface was a little dried when cut into halves and compared. On the other hand, moisture was kept in the mango frozen by the space potential generator 1.

After that, the mango was left at an ordinary temperature for three hours and then texture was compared. The mango frozen at −60° C. became dried and hard. On the other hand, the mango frozen by the space potential generator 1 could be eaten deliciously because moisture was kept.

When freezing sushi-roll (vinegared rice wrapped in seaweed), freezing is done in units of forty thousand. In the conventional devices, the electrode shelf board should be prepared and the foods should be in contact with the electrode shelf board. Therefore, a quantity capable of being frozen is limited in the conventional device.

In addition, a large amount of facility investment is required for the quick freezing because a quick freezer for special use is required.

By using the space potential generator 1 of the present invention, since freezing can be done in the best condition at −18° C., the quick freezer for special use is not required. In addition, since the electric field is formed in whole the space, the quantity capable of being frozen is not limited.

Furthermore, the food was frozen at −18° C. in the freezer with and without the space potential generator 1 to compare the result. It was confirmed that a size of ice crystals adhered to the food after being frozen was larger in the freezer not provided with the space potential generator 1. The ice crystals are very small in the refrigerator provided with the space potential generator 1 because cluster of water molecules is made smaller when being frozen. From the above, freezing can be done in the best condition without destroying fibers of the food only by providing the space potential generator 1 in the existing freezer.

As for the ISO container and the transport truck, the ISO container was conventionally transported at −20° C. from abroad spending two weeks. However, if the space potential generator 1 is installed, the transportation is possible in a chilled environment set at −5° C. while keeping freshness. From the above, electricity cost can be reduced and carbon dioxide emissions can be reduced.

Next, an oil deterioration preventing function of a fryer provided with the space potential generator of the present invention will be explained.

When the space potential generator 1 is installed on a gas fryer or an electric flyer and an electric field of 400 V or more is applied, an electric field environment can be formed in an oil tub of 100 liters by one output line and one static electricity discharger 8.

When the static electricity discharger 8 is installed on a bottom surface or a side surface of an oil tub of 20 liters single-layer, a certain effect can be obtained.

In a case of a double-layer type gas flyer or electric fryer, when a static electricity discharger 8 is installed in one of the oil tubs, an effect of a weak electric field can be obtained even in the neighboring oil tub although the static electricity discharger 8 is not installed in the neighboring oil tub. Therefore, in the case of the double-layer type gas flyer or electric fryer, the best effect can be obtained by arranging the static electricity discharger 8 at the center of two oil tubs. Since oxidation of the oil is suppressed by installing the space potential generator 1, the oil can be used more than four times longer than the oil used in the flyer not provided with the static electricity discharger 8. Since emulsion of the oil and water contained in the food is suppressed, viscosity of the oil can be easily lowered. Therefore, the oil can be continuously used by replenishing new oil without disposing the oil.

In addition, time required for frying can be shortened by 15%.

Furthermore, since emulsion of the oil and water contained in the food is suppressed and cluster of water molecules is made smaller by the effect of the space potential generator 1, thermal conductivity of the food is increased. Therefore, in the fryer provided with the space potential generator 1, a lot of steam can be seen in the oil tub just after the food was entered. This leads to reduction of oil mist and oil smoke. Thus, oil smoke is prevented from being absorbed by a worker in the kitchen and oil is prevented from entering in eyes of the worker. In addition, stickiness of the oil can be reduced in the kitchen. Therefore, health and sanitation of the worker can be improved. Since the thermal conductivity is increased, the food can be fried in a short time and the oil absorbed in the food can be reduced. Conventionally, corndogs and sausages become hard and should be disposed when 3 hours have passed after they are fried. However, by using the fryer of the present invention, they can be eaten deliciously after 12 hours have passed. Thus, disposal of the food can be reduced.

Figures 17, 18:
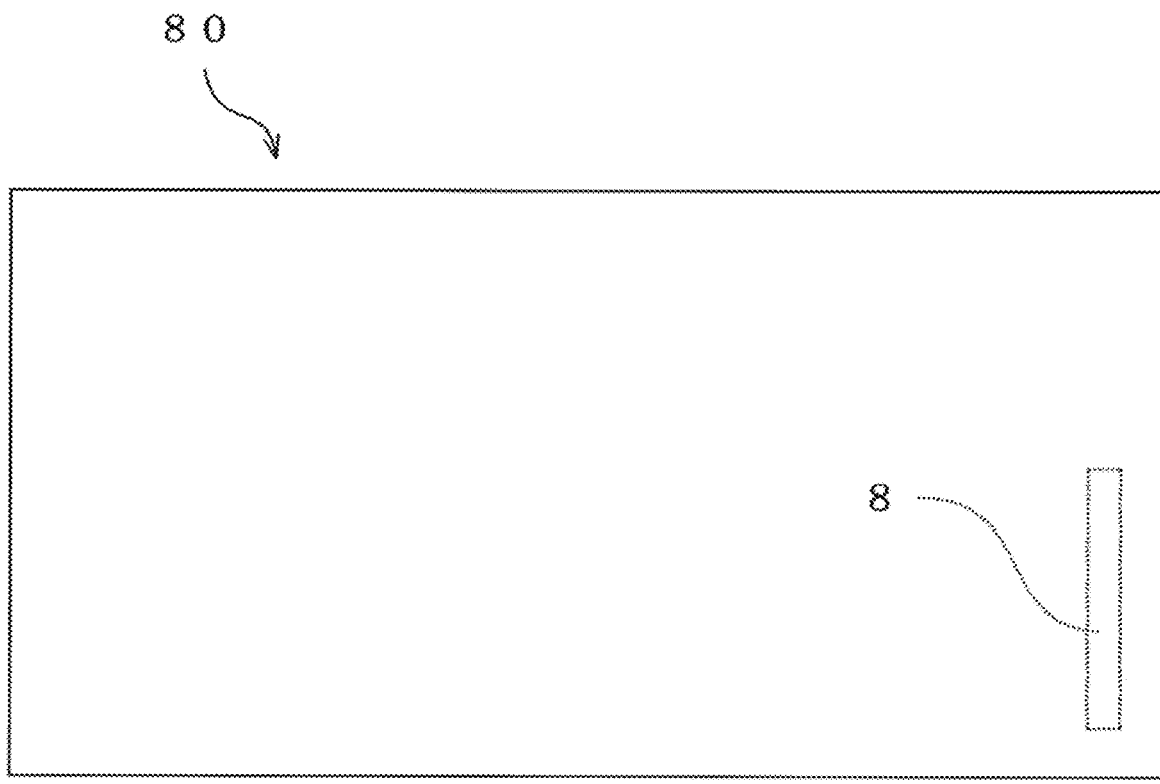
FIG. 17 shows an example that the static electricity discharger 8 is installed in an oil tub 80.
FIG. 18 is a table showing a difference of color in a comparative test of deterioration of oil using the space potential generator of the present invention.

FIG. 17 shows an example that the static electricity discharger 8 is installed in an oil tub 80.

Hereafter, a result of a comparative test about deterioration of oil using the space potential generator of the present invention.

In this test, two fryers were prepared, 6 liters of oil was entered in each of the fryers, and the space potential generator was provided on one of the fryers. Same amount of sample food is continuously fried in each of the fryers and then the oil was compared. Two fryers were separated 4 meters with each other so as to avoid an influence of the other fryer.

The static electricity discharger was an electrode of height 5 cm×width 10 cm×thickness 1 mm. Both sides of the electrode was covered with the insulating member (height 7 cm×width 12 cm×thickness 2 mm) formed of a Teflon (registered trademark) (PTFE) material. In addition, 60 holes of 4 mm were formed on the insulating member. Wires connected to the static electricity discharger were formed of a Teflon (registered trademark) (PTFE) material and had a thermal resistance resistant to a temperature of 260° C. An input voltage of the space potential generator was set to 800 V so that a voltage directly applied to the oil became 800 V.

By the above described fryers, 300 g of chicken (with starch powder) was continuously fried until 28 kg of chicken were totally fried, and then condition of the oil was compared in viewpoints of a color, an odor, an acid value, a peroxide value, and an acrylamide generation amount.

The color was judged by visual observation. The odor was judged based on a sensory evaluation performed by an odor judgment technician, which is a national qualification authorized by the Ministry of the Environment.

The acid value is a reference value generally used for measuring deterioration in Japan. Although the peroxide value is not a reference value generally used for measuring deterioration, the peroxide value was measured for confirming the effect from various aspects.

As for the acrylamide, Food Safety Commission of the Food Safety Commission of Cabinet Office in Japan now examines a risk of the acrylamide as a chemical substance contained in the food, and evaluated the acrylamid as "genotoxic carcinogen" in a draft of evaluation.

In addition, FDA (U.S. Food and Drug Administration) reported in "FDA Draft Action Plan for Acrylamide in Food" that the acrylamide having a risk of carcinogenesis and genetic damage could be generated in the processed food. Furthermore, on Apr. 24, 2002, a joint research group consisting of Swedish National Food Administration and Stockholm University published that the food contained the acrylamide when the food was cooked by frying or grilling a raw material containing a lot of carbohydrates at high temperature of 120° C. or more.

As explained above, since the acrylamide can be a carcinogen, the acrylamide generation amount was also confirmed.

In the above described condition, same amount of the food was continuously fried in two fryers for three days so as to keep fried state substantially same. A core temperature after fried was measured by a thermometer so that the core temperature became 75° C.

After the test, the used oil was collected from two fryers and the above listed test items were compared. As a result, deterioration was suppressed in the fryer provided with the space potential generator in all test items of the color, the odor, the acid value, and the peroxide value. In addition, it was confirmed that the acrylamide generation amount was reduced to a quarter.

FIG. 18 is a table comparing the color of the oil in the second day.

It was confirmed that lightness was significantly different between the oil of the fryer provided with the space potential generator and the oil of the fryer not provided with the space potential generator. A color difference between the former and the latter was 6.43.

In FIG. 18, the color difference is a value totally comparing the difference between the oil before cooking and the oil after cooking using an L*a*b* color system. Here, L indicates the lightness, +a indicates red, −a indicates green, +b indicates yellow, and −b indicates blue. According to an NBS (U.S. National Bureau of Standards) unit, a color difference value (ΔE) is considered to be large when the color difference value is 6.0 or more. The color of the oil in the fryer provided with the space potential generator is brighter than the color of the oil in the fryer not provided with the space potential generator. As explained above, the color difference was 6.43 in the second day. Thus, it was confirmed that the oil was deteriorated more significantly in the fryer not provided with the space potential generator.

A plurality of inspectors including the odor judgment technician, which is a national qualification authorized by the Ministry of the Environment, evaluated the oil in the fryer provided with the space potential generator and the oil in the fryer not provided with the space potential generator. As a result, the odor suggestive of fried chicken and the odor considered to be roasted were weak in the former oil than the latter oil. Thus, it was confirmed that the odor was less transferred to the oil.

Furthermore, when comparing the oil in the fryer provided with the space potential generator with the oil in the fryer not provided with the space potential generator by visual observation, black stains and crab bubbles were seen in the latter oil. In addition, when 200 g of potatoes were additionally fried in the latter oil after the above test, the oil smoke when frying the last 100 g of potatoes was like a steam of a bath. Thus, the working environment was deteriorated and sticky stain and bad odor were confirmed. In the oil in the fryer provided with the space potential generator, the crab bubbles were not seen and oil surface was smooth.

Figure 19:
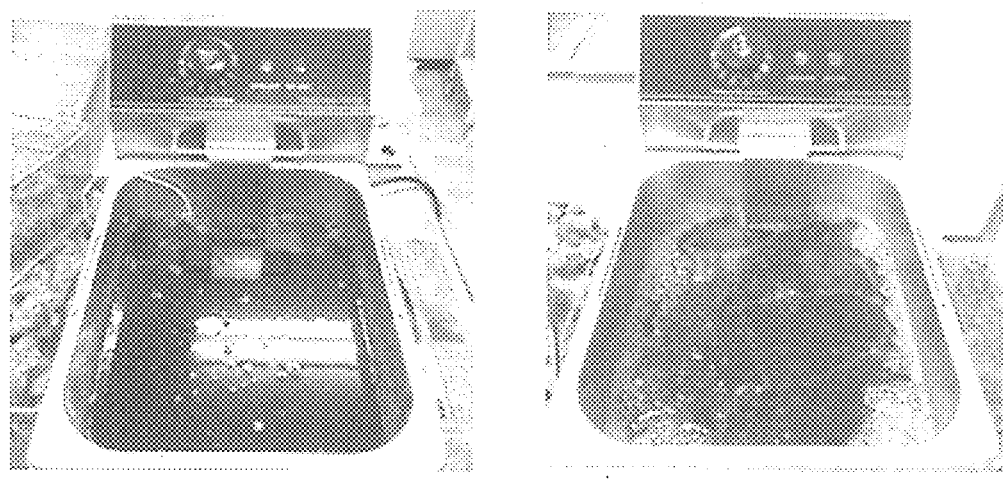
FIG. 19 shows a state of oil after 200 g of potatoes are fried comparing a fryer equipped with the space potential generator with a fryer not equipped with the space potential generator.

FIG. 19 shows a state of the oil after 200 g of potatoes were fried comparing the fryer equipped with the space potential generator with the fryer not equipped with the space potential generator.

Figure 20:
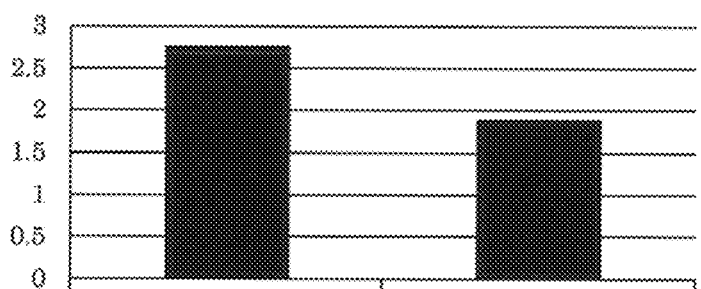
FIG. 20 is a graph showing a peroxide value of oil after three days test.

FIG. 20 is a graph showing the peroxide value of the oil after three days test.

While the peroxide value of the oil in the fryer provided with the space potential generator was 1.89, the peroxide value of the oil in the fryer not provided with the space potential generator was 2.77. From the above result, it was confirmed that the fryer provided with the space potential generator suppressed the deterioration by 32% compared to the fryer not provided with the space potential generator.

Figure 21:
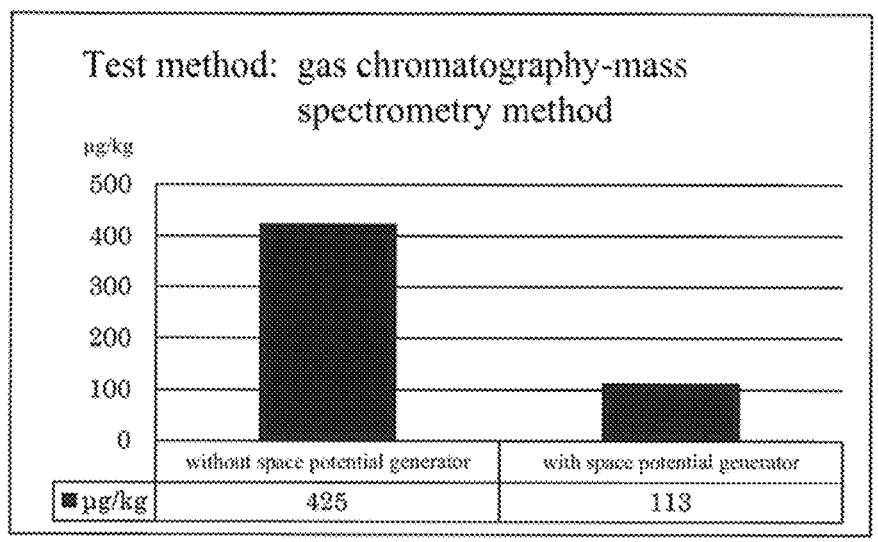
FIG. 21 is a graph showing a result measuring an amount of acrylamide contained in fried potatoes when 100 g of potatoes are additionally fried after the three days test.

FIG. 21 is a graph showing a result measuring an amount of the acrylamide contained in the fried potatoes when 100 g of potatoes were additionally fried after the three days test.

The acrylamide contained in the potatoes fried in the fryer not provided with the space potential generator was 425 μg/kg. On the other hand, the acrylamide contained in the potatoes fried in the fryer provided with the space potential generator was 113 μg/kg. It was confirmed that the acrylamide generation amount was reduced to a quarter by using the space potential generator. Since the acrylamide can be a carcinogen, the acrylamid generated by the deteriorated oil is internationally recognized as a problem. Therefore, an effect of suppressing of the acrylamide generation is important.

Next, a result of test comparing the fryer with and without the fryer the space potential generator by entering 60 g of potatoes in oil tubs of both fryers, setting a temperature to 170° C. to fry the potatoes, and comparing a change of the state of the oil. In the fryer not provided with the space potential generator, water in the food is entered in the oil by being combined and emulsified with the oil. On the other hand, in the fryer provided with the space potential generator, since the oil is combined with electrons and not combined with the water, the water in the food is immediately evaporated and not entered in the oil. Therefore, the temperature of the oil is always kept constant, and the time required for frying can be shortened. In addition, since only the water is evaporated as water vapor in the fryer provided with the space potential generator, oil mists around the fryer can be reduced. Therefore, the oil is not adhered to the kitchen and the store, and the kitchen and the store can be kept sanitary. Furthermore, since evaporation of the oil can be suppressed, odor of the oil generated when frying the food can be suppressed. For example, the oil is prevented from adhering to cloths of the customers in the store.

Finally, a result of a comparative test of time required for frying frozen chicken will be explained.

The time required for frying the frozen chicken was compared between the fryers with and without the space potential generator.

A capacity of the oil tub of both fryers was 6 liters. A temperature was set to 165° C. A center temperature of the fried chicken was measured when 2 minutes and 30 seconds had passed and when 3 minutes had passed for comparison.

In the fryer provided with the space potential generator, the center temperature of the fried chicken was 83.6° C. when 2 minutes and 30 seconds had passed, and 95° C. when 3 minutes had passed. On the other hand, in the fryer not provided with the space potential generator, the center temperature of the fried chicken was 34.6° C. when 2 minutes and 30 seconds had passed, and 80° C. when 3 minutes had passed. From the above, it was confirmed that thermal conductivity was higher and the time required for frying was shorter in the fryer provided with the space potential generator.

Figure 22:
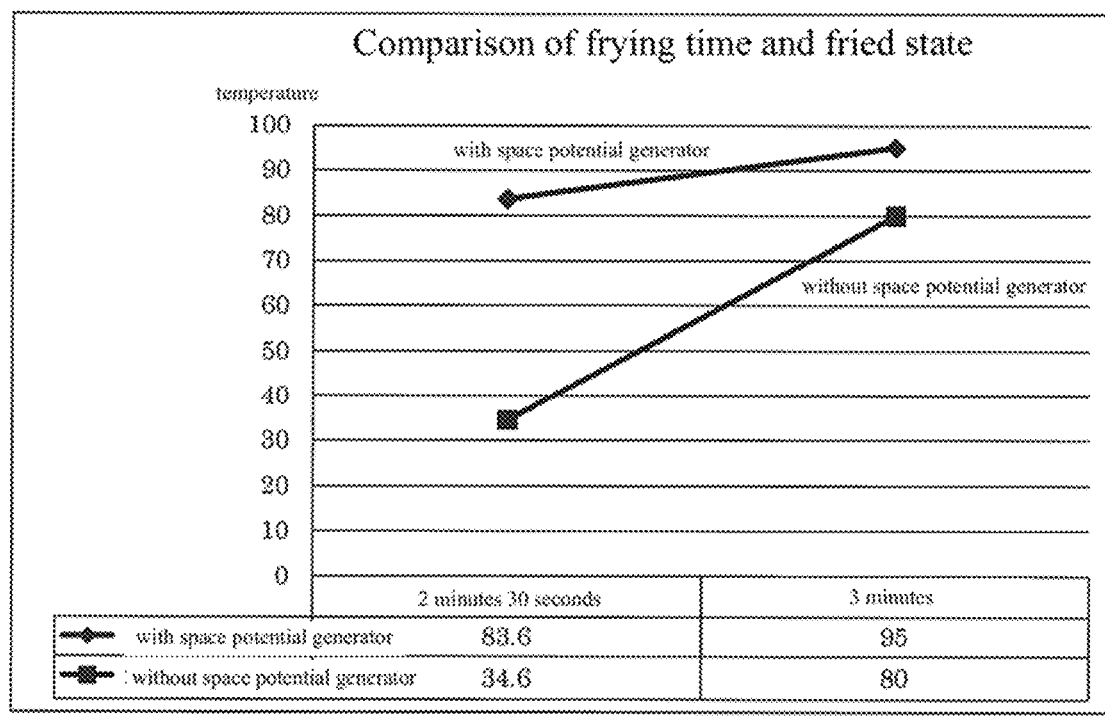
FIG. 22 is a graph showing a comparative result of frying time.

FIG. 22 is a graph showing a comparative result of frying time.

Evaluation in Actual Store

In a store conventionally using 405 liters (22.5 cans) of oil per month, the space potential generator was installed on the fryer and the temperature of frying was lowered from 180° C. to 170° C. after installing the space potential generator. As a result, the oil used in the store is reduced to 108 liters (6 cans) per month. The oil used was reduced by 73%. In addition, the time required for frying was shortened by 10% or more. Thus, efficiency of work was improved.

If the electric field is formed in the oil in the fryer by using the space potential generator, the best effect could be obtained because thermal conductivity of the food was increased and the fried food became crispy. Furthermore, the oil smoke was prevented because the water is evaporated. Thus, the worker in the kitchen did not feel pain in eyes.

Note that, this invention is not limited to the above-mentioned embodiments. Although it is to those skilled in the art, the following are disclosed as the one embodiment of this invention.

Mutually substitutable members, configurations, etc. disclosed in the embodiment can be used with their combination altered appropriately.

Although not disclosed in the embodiment, members, configurations, etc. that belong to the known technology and can be substituted with the members, the configurations, etc. disclosed in the embodiment can be appropriately substituted or are used by altering their combination.

Although not disclosed in the embodiment, members, configurations, etc. that those skilled in the art can consider as substitutions of the members, the configurations, etc. disclosed in the embodiment are substituted with the above mentioned appropriately or are used by altering its combination.

While the invention has been particularly shown and described with respect to preferred embodiments thereof, it should be understood by those skilled in the art that the foregoing and other changes in form and detail may be made therein without departing from the sprit and scope of the invention as defined in the appended claims.

What is claimed is:

1. A storage device, comprising:
a potential generator; and
a compartment for determining a storage space formed around a discharging electrode of the potential generator, wherein
the potential generator comprising:
    a transformer that is composed of a primary coil and a secondary coil;
    a feedback control circuit that feeds back one terminal of the secondary coil to one terminal of the primary coil to adjust a voltage of the secondary coil;
    an output control portion that is provided on the other terminal of the secondary coil to impart a predetermined low frequency vibration to an output of the secondary coil which causes the discharging electrode physically vibrates; and
    the discharging electrode that is formed of a conductive material and provided on the other terminal of the secondary coil via the output control portion, wherein
the feedback control circuit and the output control portion are formed to cause a delay in the circuit so that the low frequency vibration is applied to the discharging electrode of the secondary coil,
a vibration frequency of the low frequency vibration applied is 40 Hz to 60 Hz which is determined by the output control portion.

2. The storage device according to claim 1, wherein
the discharging electrode is covered with an insulating member.

3. The storage device according to claim 1, wherein
the discharging electrode is consisted of a conductive plate.

4. The storage device according to claim 3, wherein
a plurality of opening parts is formed on the conductive plate.

5. The storage device according to claim 1, wherein
the compartment for determining the storage space is a refrigerator;
the discharging electrode of the potential generator is installed in the refrigerator; and
the refrigerator forms the storage space.

* * * * *